United States Patent
Kawamura

(10) Patent No.: US 9,624,434 B2
(45) Date of Patent: *Apr. 18, 2017

(54) NEMATIC LIQUID CRYSTAL COMPOSITION AND LIQUID CRYSTAL DISPLAY DEVICE USING THE SAME

(71) Applicant: DIC CORPORATION, Tokyo (JP)

(72) Inventor: Joji Kawamura, Saitama (JP)

(73) Assignee: DIC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/371,120

(22) PCT Filed: Nov. 28, 2012

(86) PCT No.: PCT/JP2012/080733
§ 371 (c)(1),
(2) Date: Jul. 8, 2014

(87) PCT Pub. No.: WO2014/083636
PCT Pub. Date: Jun. 5, 2014

(65) Prior Publication Data
US 2015/0299569 A1    Oct. 22, 2015

(51) Int. Cl.
*C09K 19/20*    (2006.01)
*C09K 19/34*    (2006.01)
(Continued)

(52) U.S. Cl.
CPC .......... *C09K 19/3402* (2013.01); *C09K 19/42* (2013.01); *C09K 2019/0466* (2013.01);
(Continued)

(58) Field of Classification Search
CPC ................................................. C09K 19/3066
(Continued)

(56) References Cited

U.S. PATENT DOCUMENTS

2002/0146893 A1    10/2002    Shimoda et al.
2003/0224582 A1    12/2003    Shimoda et al.
(Continued)

FOREIGN PATENT DOCUMENTS

CN           101565624 A      10/2009
DE    10 2009 009 631 A1      9/2009
(Continued)

OTHER PUBLICATIONS

International Search Report dated Feb. 12, 2013, issued in corresponding application No. PCT/JP2012/080733.
(Continued)

*Primary Examiner* — Chanceity Robinson
(74) *Attorney, Agent, or Firm* — Westerman, Hattori, Daniels & Adrian, LLP

(57)    ABSTRACT

The liquid crystal composition of the present invention is used for liquid crystal display devices of an IPS mode, a TN mode, and the like that have a high response speed and do not easily cause display defectiveness such as ghosting or dropping marks. The liquid crystal composition contains a component which is a dielectrically positive component containing a dielectrically positive compound and a dielectrically neutral component which exhibits dielectric anisotropy greater than −2 and smaller than +2. The liquid crystal composition has excellent properties in which the composition forms a liquid crystal phase in a wide temperature range, has a low viscosity, dissolves excellently at a low temperature, has a high degree of specific resistance and voltage holding ratio, and is stable with respect to heat or light.

18 Claims, 1 Drawing Sheet

(51) Int. Cl.
*C09K 19/42* (2006.01)
*C09K 19/04* (2006.01)
*C09K 19/12* (2006.01)
*C09K 19/30* (2006.01)

(52) U.S. Cl.
CPC .. *C09K 2019/124* (2013.01); *C09K 2019/301* (2013.01); *C09K 2019/3004* (2013.01); *C09K 2019/3019* (2013.01); *C09K 2019/3025* (2013.01); *C09K 2019/3422* (2013.01)

(58) Field of Classification Search
USPC .................................................. 252/299.61
See application file for complete search history.

(56) References Cited

U.S. PATENT DOCUMENTS

| | | |
|---|---|---|
| 2004/0219762 A1 | 11/2004 | Shimoda et al. |
| 2006/0030122 A1 | 2/2006 | Shimoda et al. |
| 2006/0278850 A1 | 12/2006 | Czanta et al. |
| 2007/0010067 A1 | 1/2007 | Shimoda et al. |
| 2009/0194739 A1* | 8/2009 | Wittek .................... C09K 19/42 252/299.61 |
| 2009/0230355 A1* | 9/2009 | Czanta .................... C09K 19/20 252/299.61 |
| 2011/0001090 A1* | 1/2011 | Wittek ............... C09K 19/3402 252/299.61 |
| 2012/0032112 A1 | 2/2012 | Czanta et al. |
| 2012/0141694 A1* | 6/2012 | Matsumoto et al. .......... 428/1.1 |
| 2012/0256124 A1* | 10/2012 | Ohgiri .................... C09K 19/32 252/299.61 |
| 2013/0256596 A1 | 10/2013 | Hirschmann et al. |

FOREIGN PATENT DOCUMENTS

| | | |
|---|---|---|
| EP | 1 726 633 A1 | 11/2006 |
| JP | 2004-140381 A | 5/2004 |
| JP | 2008-037918 A | 2/2008 |
| JP | 2008-038018 A | 2/2008 |
| JP | 2010-275390 A | 12/2010 |
| JP | 2011-052120 | 3/2011 |
| KR | 1020090084760 A | 8/2009 |
| KR | 1020120003857 A | 1/2012 |
| KR | 1020120115472 A | 10/2012 |
| WO | 2010/131614 A1 | 11/2010 |
| WO | WO 2010131614 A1 * | 11/2010 |
| WO | 2012/079676 A | 6/2012 |

OTHER PUBLICATIONS

Extended European Search Report dated Sep. 16, 2015, issued in counterpart European Patent Application No. 12889062.1 (10 pages).

* cited by examiner

NEMATIC LIQUID CRYSTAL COMPOSITION AND LIQUID CRYSTAL DISPLAY DEVICE USING THE SAME

TECHNICAL FIELD

The present invention relates to a nematic liquid crystal composition, which is useful as a liquid crystal display material and has dielectric anisotropy (Δ∈) of a positive value, and a liquid crystal display device using the composition.

BACKGROUND ART

Liquid crystal display devices are being used for timepieces, electronic calculators, various measurement instruments, automobile panels, word processors, electronic diaries, printers, computers, televisions, timepieces, advertising display boards, and the like. The liquid crystal display modes typically include a Twisted Nematic (TN) mode, a Super-Twisted Nematic (STN) mode, a vertical alignment mode using a Thin Transistor Film (TFT), In-Plane Switching (IPN) mode, and the like. A Liquid crystal composition used for these liquid crystal display devices is required to be stable with respect to external stimulation such as moisture, air, heat, and light, forms a liquid crystal phase in the widest possible temperature range with room temperature as a center of the range if possible, and has a low viscosity and a low driving voltage. Moreover, the liquid crystal composition is constituted with several to dozens of types of compounds to yield optimal values of a dielectric anisotropy (Δ∈), a refractive index anisotropy (Δn), and the like in each of the display devices.

In the Vertical Alignment (VA) display mode, a liquid crystal composition showing negative Δ∈ is used, and in a horizontal alignment display mode such as the TN mode, STN mode, or In-Plane Switching (IPS) mode, a liquid crystal composition showing positive Δ∈ is used. Moreover, there is also a report regarding a driving mode for performing display by means of vertically aligning a liquid crystal composition showing positive Δ∈ when voltage is not applied and applying a transverse electric field thereto. Accordingly, there is an increasing need for a liquid crystal composition showing positive Δ∈. Meanwhile, in all of driving modes, low-voltage driving, high-speed response, and a wide driving temperature range are required. That is, it is required that Δ∈ be positive and have a great absolute value, a viscosity (η) be low, and a nematic phase-isotropic liquid phase transition temperature (Tni) be high. Further, it is necessary to adjust Δn of the liquid crystal composition within an appropriate range according to a cell gap, by means of set Δn×d which is a product of Δn and the cell gap (d). In addition, when the liquid crystal display devices are applied to televisions and the like, high-speed responsiveness is emphasized, and accordingly, a liquid crystal composition having a low rotational viscosity (γ1) is required.

Regarding the constitution of liquid crystal compositions focusing on the high-speed responsiveness, for example, there is a disclosure about liquid crystal compositions using a combination of a liquid crystal compound which shows positive Δ∈ and corresponds to a compound represented by Formula (A-1) or (A-2) and a liquid crystal compound (B) showing neutral Δ∈. In these liquid crystal compositions, the liquid crystal compound showing positive Δ∈ has a —CF₂O— structure, and the liquid crystal compound showing neutral Δ∈ has an alkenyl group. These characteristics are widely known in the field of such liquid crystal compositions (PTL 1 to 4).

[Chem. 1]

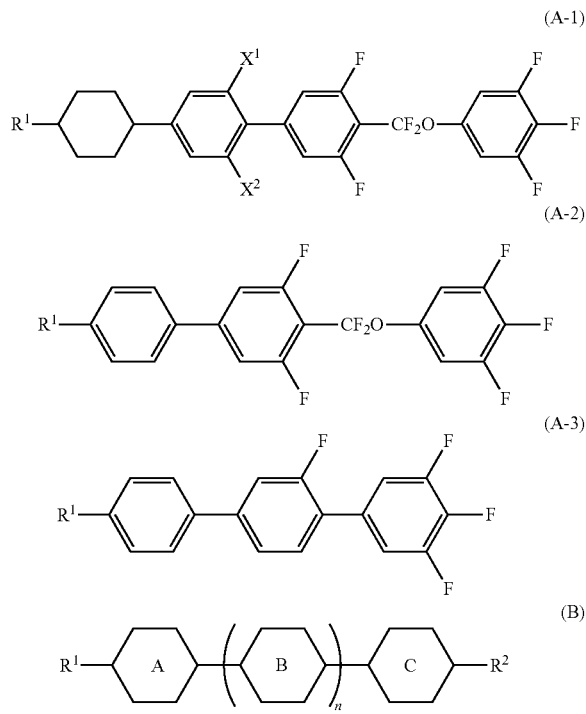

Meanwhile, as the use of the liquid crystal display device becomes more diverse, there has been great changes in the use and the production method thereof. In order to address such changes, it is required to optimize the characteristics other than the conventionally known values of the basic physical properties. That is, for liquid crystal display devices using a liquid crystal composition, the VA mode, the IPS mode, and the like are widely used, and regarding the size, the supersized display devices that are equal to or larger than 50 inches have become commercialized and used. As the substrate size is enlarged, instead of the conventional vacuum fill process, One Drop Fill (ODF) process is mainly used as a method for filling a substrate with a liquid crystal composition. However, a problem that display quality deteriorates due to marks on composition caused from when the liquid crystal composition is dropped onto the substrate has been noticed. Moreover, in a liquid crystal display device production process performed by the ODF process, according to the size of the liquid crystal display device, liquid crystals for filling need to be dropped in an optimal amount. If the filling amount significantly deviates from the optimal value, the refractive index or driving electric field, which is designed beforehand, of the liquid crystal display device is thrown off balance, and this leads to display defectiveness such as formation of spots, contrast defectiveness, and the like. Particularly, the optimal amount of liquid crystals for filling small-sized liquid crystal display devices, which are frequently used in smart phones that are in vogue these days, is small. Therefore, it is difficult to control the deviation amount from the optimal value to be within a certain range. Consequently, in order to maintain a high yield of the liquid crystal display device, for example, the device needs to be influenced less by sudden pressure change or impact caused in a dropping apparatus during dropping of liquid crystals, and needs to have performance that makes it possible to stably and continuously drop liquid crystals over a long time.

As described so far, the liquid crystal composition used in an active matrix driving liquid crystal display device that is driven by a TFT device or the like is required to be developed, in consideration of the characteristics in which the device maintains properties or performances such as high-speed responsiveness that is required for a liquid crystal display device, has a high degree of specific resistance or voltage holding ratio that have been conventionally emphasized, and is stable with respect to external stimulation such as light or heat, as well as the production method of the liquid crystal display device.

CITATION LIST

Patent Literature

[PTL 1] Japanese Unexamined Patent Application, First Publication No. 2008-037918
[PTL 2] Japanese Unexamined Patent Application, First Publication No. 2008-038018
[PTL 3] Japanese Unexamined Patent Application, First Publication No. 2010-275390
[PTL 4] Japanese Unexamined Patent Application, First Publication No. 2011-052120

SUMMARY OF INVENTION

Technical Problem

An object of the present invention is to provide a liquid crystal composition which shows positive $\Delta\epsilon$, forms a liquid crystal phase in a wide temperature range, has a low viscosity, dissolves excellently at a low temperature, exhibits a high degree of specific resistance and voltage holding ratio, and is stable with respect to heat or light. Another object of the present invention is to provide a liquid crystal display device which has excellent display quality, does not easily cause display defectiveness such as ghosting or dropping marks, and uses the IPS mode, TN mode, and the like, at a high yield by using the above liquid crystal composition.

Solution to Problem

As a result of conducting research on various liquid crystal compounds and chemical substances, the present inventors found that the above objects can be achieved by combining specific liquid crystal compounds with each other and completed the present invention.

That is, the present invention provides a liquid crystal composition showing positive dielectric anisotropy, containing a dielectrically positive component (A) which contains a dielectrically positive compound represented by Formula (1.1),

[Chem. 2]

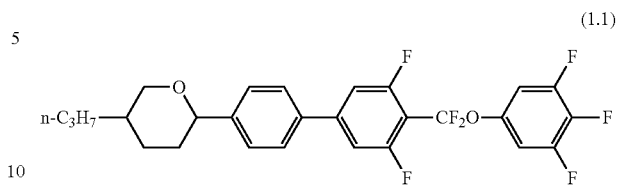

(1.1)

and a dielectrically neutral component (B) which contains a compound represented by Formula (2.1).

[Chem. 3]

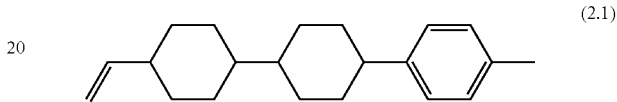

(2.1)

The present invention also provides a liquid crystal display device using the liquid crystal composition.

Advantageous Effects of Invention

The liquid crystal composition of the present invention that shows positive dielectric anisotropy can have an extremely low viscosity, dissolves excellently at a low temperature, and exhibits an extremely small degree of change in the specific resistance or voltage holding ratio even if being influenced by heat or light. Accordingly, practicality of the composition as a product is high, and liquid crystal display devices, which use the IPS mode, FFS mode, and the like, using the composition can demonstrate high-speed response. Moreover, during the liquid crystal display device production process, the liquid crystal composition can exhibit its performance stably produced, and accordingly, display defectiveness that may be caused by the process can be suppressed, and the device can be produced at a high yield. Therefore, the liquid crystal composition is extremely useful.

DESCRIPTION OF EMBODIMENTS

Figure 1:
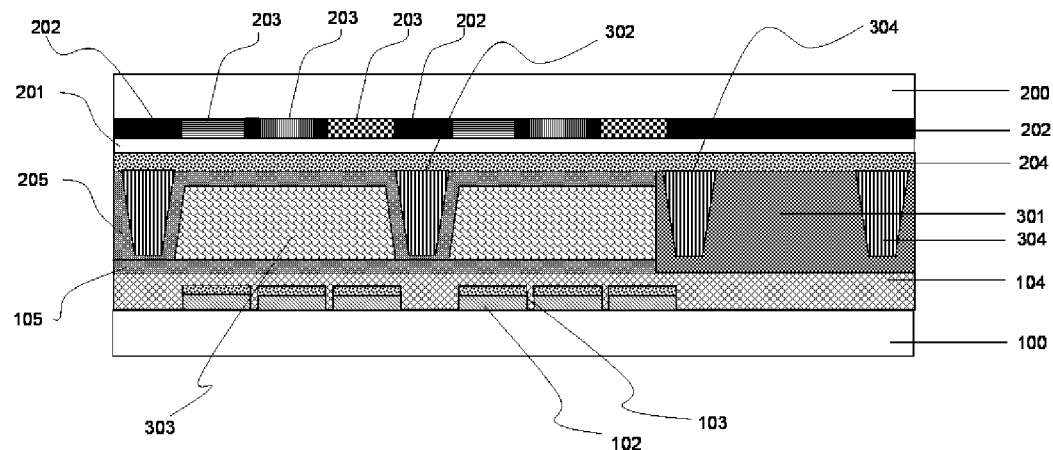
FIG. 1 is a cross-sectional view of the liquid crystal display device of the present invention. The substrate including 100 to 105 is called a "back plane", and the substrate including 200 to 205 is called a "front plane".
Figure 2:
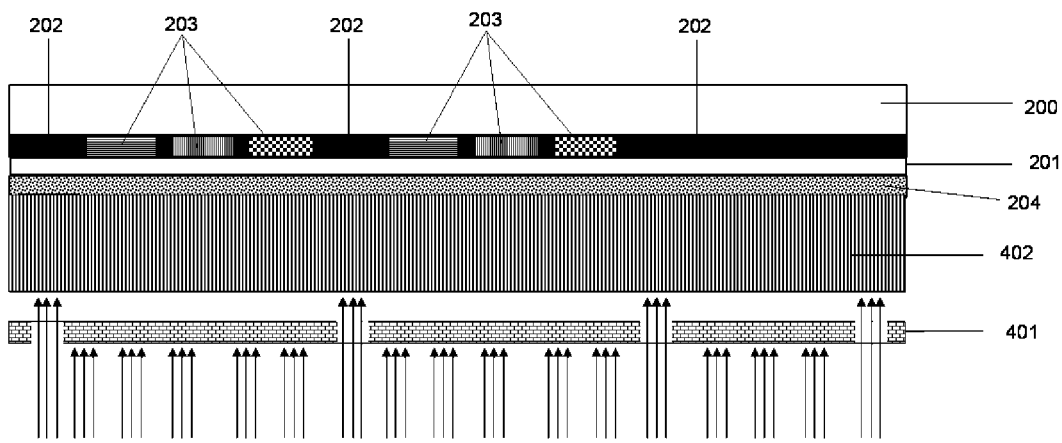
FIG. 2 is a view of a light-exposure treatment process in which a pattern for preparing a columnar spacer that is formed on a black matrix is used as a photomask pattern.

The liquid crystal composition of the present invention that shows positive dielectric anisotropy contains a component (A) which is a dielectrically positive component. Moreover, the component (A) contains a compound represented by Formula (1.1).

[Chem. 4]

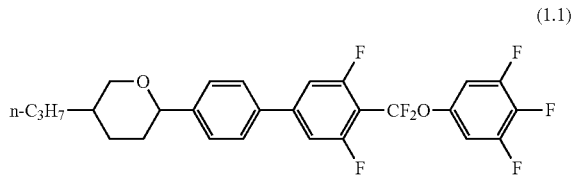

(1.1)

In the liquid crystal composition of the present invention, the content of the compound which constitutes the component (A) and is represented by Formula (1.1) is preferably 2% by mass or more, more preferably 3% by mass or more, even more preferably 4% by mass or more, still more preferably 5% by mass or more, yet more preferably 6% by mass or more, more preferably 7% by mass or more, even more preferably 8% by mass or more, and particularly preferably 10% by mass or more, based on a total amount of the liquid crystal composition of the present invention. The upper limit of the content is preferably 30% by mass, more preferably 25% by mass, and even more preferably 20% by mass.

It is preferable for the dielectrically positive component (A) of the liquid crystal composition of the present invention to contain one, two, or more kinds of compounds represented by General formula (I).

[Chem. 5]

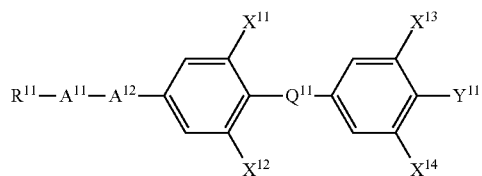

(I)

(In the formula, $R^{11}$ represents an alkyl group having 2 to 5 carbon atoms, each of $X^{11}$ to $X^{14}$ independently represent a fluorine atom or a hydrogen atom, $Y^{11}$ represents a fluorine atom or —$OCF_3$, $A^{11}$ represents a 1,4-phenylene group, a 1,4-cyclohexylene group,

[Chem. 6]

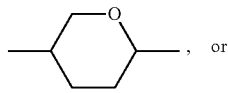, or

[Chem. 7]

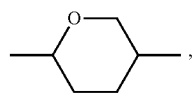, $A^{12}$ represents a 1,4-phenyene group or a 1,4-cyclohexylene group, and $Q^{11}$ represents a single bond or —$CF_2O$—.)

These compounds are particularly preferable since they can produce both the effect of enlarging liquid crystal phases of a temperature range and the effect of suppressing the viscosity to be low, and also has the effect of improving display quality. The component (A) may contain only one kind among these compounds or contain two or more kinds of the compounds. However, it is preferable to combine the compounds with each other appropriately, according to the required performance. The kind of the compounds that can be combined with each other is not particularly limited. However, the component (A) contains preferably one to three kinds, more preferably one to four kinds, even more preferably one to five kinds, still more preferably one to six kinds, and yet more preferably one to seven kinds among these compounds.

Specifically, the compounds represented by General formula (I) are preferably compounds selected from a group of compounds represented by Formula (5.1) and Formulae (12.1) to (12.4).

[Chem. 8]

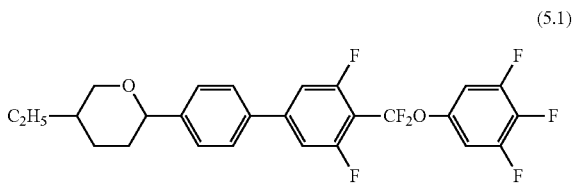

(5.1)

[Chem. 9]

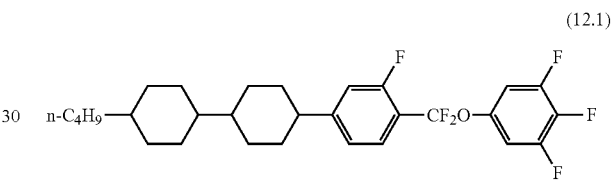

(12.1)

[Chem. 10]

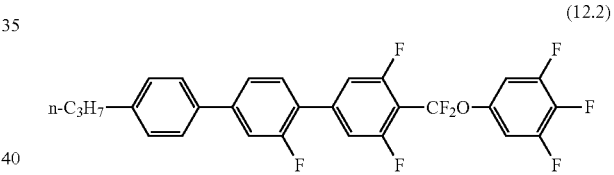

(12.2)

[Chem. 11]

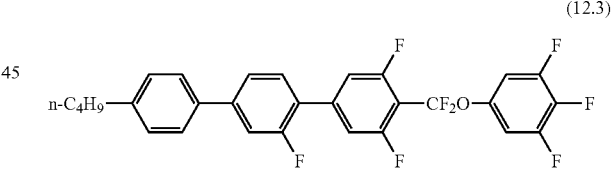

(12.3)

[Chem. 12]

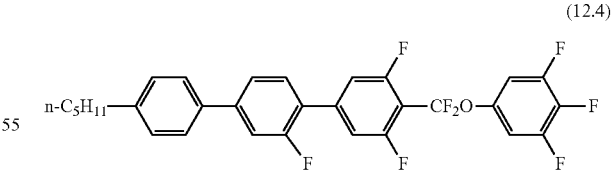

(12.4)

The component (A) may contain only one kind among these compounds or contain two or more kinds of the compounds. However, it is preferable to combine the compounds with each other appropriately, according to the required performance such as dielectric anisotropy, birefringence, or Tni. The kind of compounds that can be combined with each other is not particularly limited. However, the component (A) contains preferably one to three kinds, more preferably one to four kinds, and even more preferably one to five kinds among these compounds. It is particularly preferable for the component (A) to contain the compound represented by Formula (12.3) or (12.4).

The content of the compound represented by Formula (5.1) is preferably 2% by mass or more, more preferably 3% by mass, even more preferably 4% by mass or more, still more preferably 5% by mass or more, yet more preferably 6% by mass or more, more preferably 7% by mass or more, even more preferably 8% by mass or more, and particularly preferably 11% by mass or more, based on a total amount of the liquid crystal composition of the present invention. The upper limit of the content is preferably 30% by mass, more preferably 25% by mass, and even more preferably 20% by mass.

The content of the compound represented by Formula (12.2) is preferably 2% by mass or more, more preferably 3% by mass, even more preferably 4% by mass or more, still more preferably 5% by mass or more, yet more preferably 6% by mass or more, more preferably 7% by mass or more, even more preferably 8% by mass or more, and particularly preferably 11% by mass or more, based on a total amount of the liquid crystal composition of the present invention. The upper limit of the content is preferably 25% by mass, more preferably 20% by mass, and even more preferably 15% by mass.

The content of the compound represented by Formula (12.3) is preferably 2% by mass or more, more preferably 3% by mass, even more preferably 4% by mass or more, still more preferably 5% by mass or more, yet more preferably 6% by mass or more, more preferably 7% by mass or more, even more preferably 8% by mass or more, and particularly preferably 11% by mass or more, based on a total amount of the liquid crystal composition of the present invention. The upper limit of the content is preferably 25% by mass, more preferably 20% by mass, and even more preferably 15% by mass.

The content of the compound represented by Formula (12.4) is preferably 1% by mass or more, more preferably 2% by mass, even more preferably 3% by mass or more, still more preferably 5% by mass or more, yet more preferably 6% by mass or more, more preferably 7% by mass or more, even more preferably 8% by mass or more, and particularly preferably 11% by mass or more, based on a total amount of the liquid crystal composition of the present invention. The upper limit of the content is preferably 25% by mass, more preferably 20% by mass, and even more preferably 15% by mass.

Specifically, the compounds represented by General formula (I) are also preferably compounds selected from a group of compounds represented by Formula (6.1) or (6.2).

[Chem. 13]

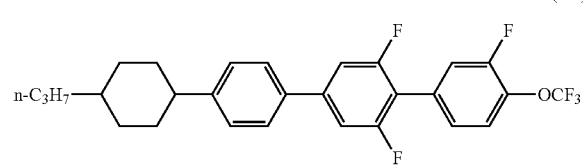

(6.1)

[Chem. 14]

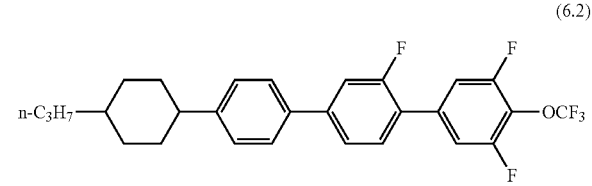

(6.2)

The component (A) may contain only one kind among these compounds or contain two or more kinds of the compounds. However, it is preferable to combine the compounds with each other appropriately, according to the required performance such as dielectric anisotropy, birefringence, or Tni. The compounds are more preferably the compounds represented by Formula (6.1).

The content of the compounds represented by Formula (6.1) or (6.2) is preferably 5% by mass or more, more preferably 7% by mass or more, and even more preferably 9% by mass or more, based on a total amount of the liquid crystal composition of the present invention. The upper limit of the content is preferably 25% by mass, more preferably 20% by mass, and even more preferably 15% by mass.

Specifically, the compounds represented by General formula (I) are also preferably the compounds selected from a group of compounds represented by Formulae (19.1) to (19.7).

[Chem. 15]

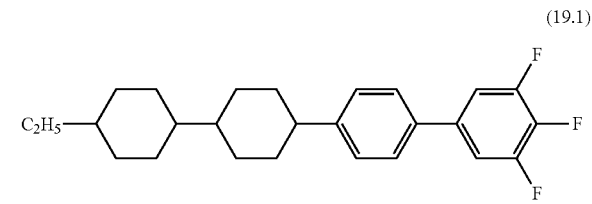

(19.1)

[Chem. 16]

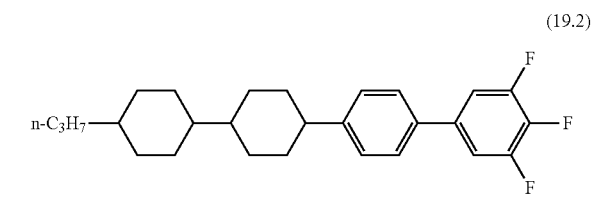

(19.2)

[Chem. 17]

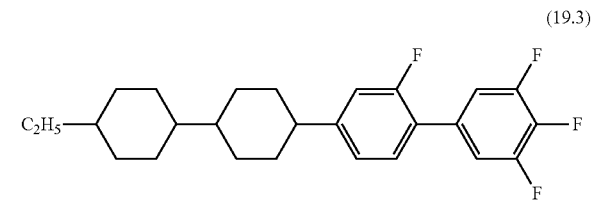

(19.3)

[Chem. 18]

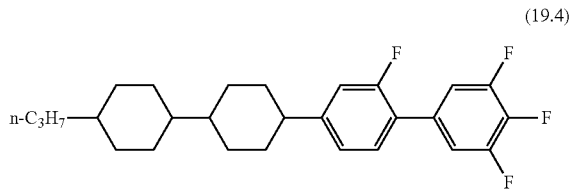
(19.4)

[Chem. 19]

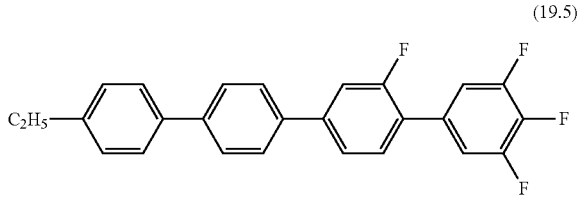
(19.5)

[Chem. 20]

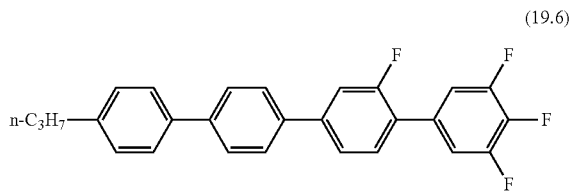
(19.6)

[Chem. 21]

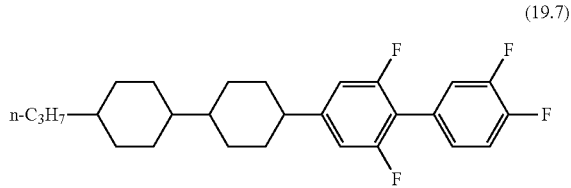
(19.7)

The component (A) may contain only one kind among these compounds or contain two or more kinds of the compounds. However, it is preferable to combine the compounds with each other appropriately, according to the required performance such as dielectric anisotropy, birefringence, or Tni. The component (A) contains preferably one to three kinds, more preferably one to four kinds, and even more preferably one to five kinds among these compounds. It is particularly preferable for the component (A) to contain the compound represented by Formula (19.6) or (19.7).

The content of the compound represented by Formula (19.1) is preferably 1% by mass or more, more preferably 3% by mass or more, and even more preferably 5% by mass or more, based on a total amount of the liquid crystal composition of the present invention. The upper limit of the content is preferably 20% by mass, more preferably 15% by mass, and even more preferably 10% by mass.

The content of the compound represented by Formula (19.2) is preferably 1% by mass or more, more preferably 3% by mass or more, and even more preferably 5% by mass or more, based on a total amount of the liquid crystal composition of the present invention. The upper limit of the content is preferably 20% by mass, more preferably 15% by mass, and even more preferably 10% by mass.

The content of the compound represented by Formula (19.3) or (19.4) is preferably 1% by mass or more, more preferably 5% by mass or more, and even more preferably 7% by mass or more, based on a total amount of the liquid crystal composition of the present invention. The upper limit of the content is preferably 20% by mass, more preferably 15% by mass, and even more preferably 10% by mass.

The content of the compound represented by Formula (19.5) or (19.6) is preferably 1% by mass or more, more preferably 2% by mass or more, and even more preferably 3% by mass or more, based on a total amount of the liquid crystal composition of the present invention. The upper limit of the content is preferably 10% by mass, more preferably 6% by mass, and even more preferably 4% by mass.

The content of the compound represented by Formula (19.7) is preferably 1% by mass or more, more preferably 5% by mass or more, and even more preferably 7% by mass or more, based on a total amount of the liquid crystal composition of the present invention. The upper limit of the content is preferably 20% by mass, more preferably 15% by mass, and even more preferably 10% by mass.

It is preferable for the dielectrically positive component (A) of the liquid crystal composition of the present invention to further contain one, two, or more kinds of compounds represented by General formula (III).

[Chem. 22]

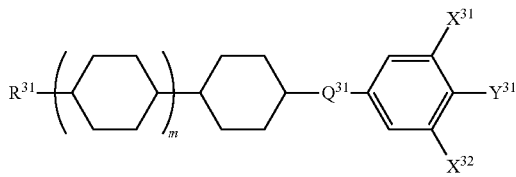
(III)

(In the formula, $R^{31}$ represents an alkyl group having 2 to 5 carbon atoms, each of $X^{31}$ and $X^{32}$ independently represents a fluorine atom or a hydrogen atom, $Y^{31}$ represents a fluorine atom, a chlorine atom or —$OCF_3$, $Q^{31}$ represents a single bond or —$CF_2O$—, and m is 0 or 1.) The component (A) may contain only one kind among these compounds or contain two or more kinds of the compounds. However, it is preferable to combine the compounds with each other appropriately, according to the required performance. The kind of compounds that can be combined with each other is not particularly limited. However, the component (A) contains preferably one to three kinds, more preferably one to four kinds, even more preferably one to five kinds, still more preferably one to six kinds, and particularly preferably one to seven kinds among these compounds.

Specifically, the compounds represented by General formula (III) are preferably compounds selected from a group of compounds represented by Formulae (11.1) to (11.6).

[Chem. 23]

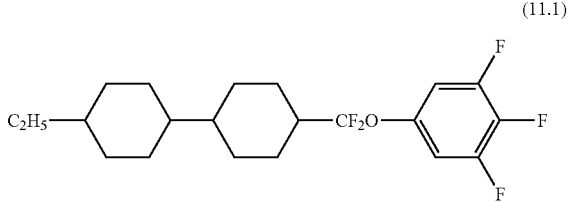
(11.1)

-continued

[Chem. 24]

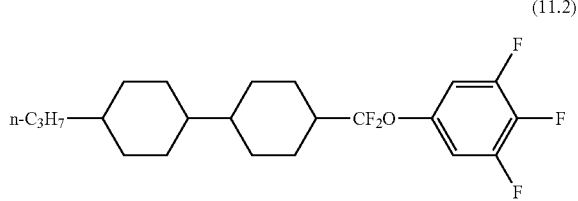
(11.2)

[Chem. 25]

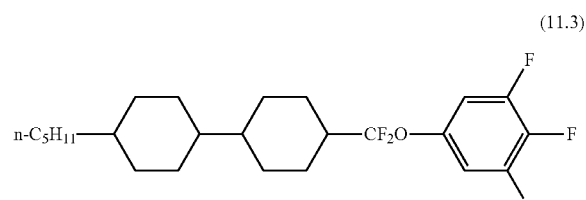
(11.3)

[Chem. 26]

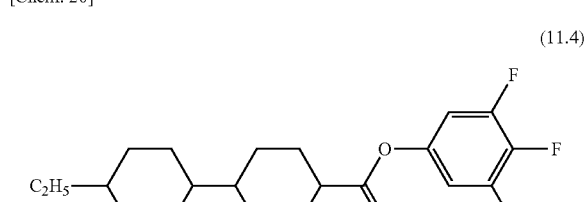
(11.4)

[Chem. 27]

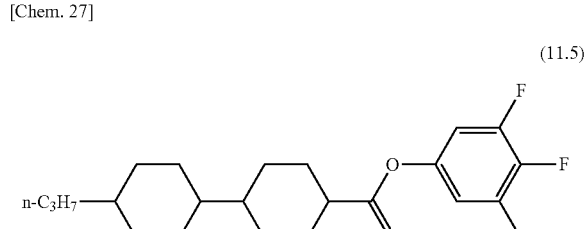
(11.5)

[Chem. 28]

(11.6)

The component (A) may contain only one kind among these compounds or contain two or more kinds of the compounds. However, it is preferable to combine the compounds with each other appropriately, according to the required performance such as dielectric anisotropy, birefringence, or Tni. The component (A) contains preferably one to three kinds and more preferably one to four kinds among these compounds. It is particularly preferable for the component (A) to contain the compound represented by Formula (11.2) or (11.3).

The content of the compounds represented by Formulae (11.1) to (11.3) is preferably 1% by mass or more, more preferably 4% by mass or more, even more preferably 6% by mass or more, still more preferably 8% by mass or more, and yet more preferably 10% by mass or more, based on a total amount of the liquid crystal composition of the present invention. The upper limit of the content is preferably 30% by mass, more preferably 25% by mass, and even more preferably 20% by mass.

The content of the compounds represented by Formulae (11.4) to (11.6) is preferably 2% by mass or more, more preferably 5% by mass or more, and even more preferably 12% by mass or more, based on a total amount of the liquid crystal composition of the present invention. The upper limit of the content is preferably 30% by mass, more preferably 25% by mass, and even more preferably 20% by mass.

Specifically, the compounds represented by General formula (III) are preferably compound selected from a group of compounds represented by Formulae (18.1) to (18.4).

[Chem. 29]

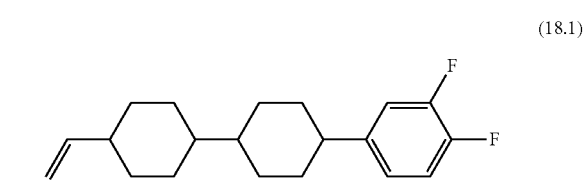
(18.1)

[Chem. 30]

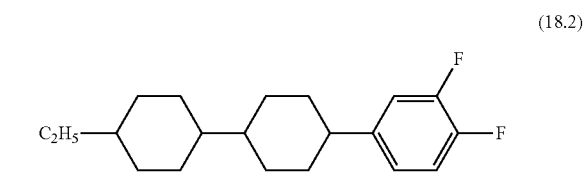
(18.2)

[Chem. 31]

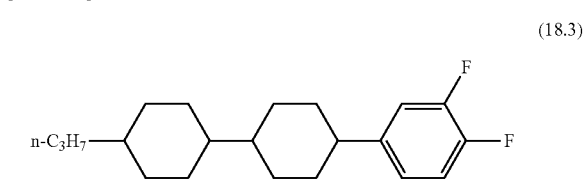
(18.3)

[Chem. 32]

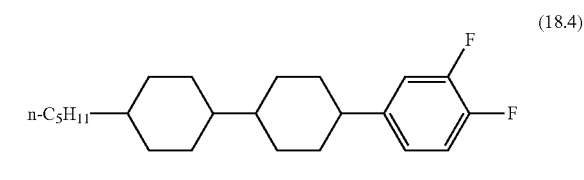
(18.4)

The component (A) may contain only one kind among these compounds or contain two or more kinds of the compounds. However, it is preferable to combine the compounds with each other appropriately, according to the required performance such as dielectric anisotropy, birefringence, or Tni. It is preferable for the component (A) to contain one to three kinds among these compounds.

The content of the compounds represented by Formulae (18.1) to (18.4) is preferably 4% by mass or more, more preferably 7% by mass or more, and even more preferably 10% by mass or more, based on a total amount of the liquid crystal composition of the present invention. The upper limit of the content is preferably 30% by mass, more preferably 25% by mass, and even more preferably 20% by mass.

Specifically, the compounds represented by General formula (III) are preferably compounds selected from a group of compounds represented by Formulae (20.1) to (20.8).

[Chem. 33]

(20.1)

[Chem. 34]

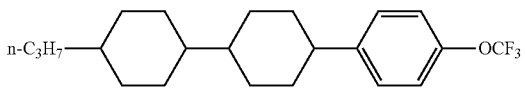
(20.2)

[Chem. 35]

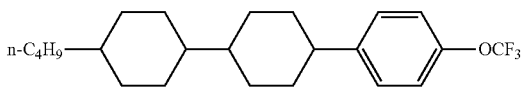
(20.3)

[Chem. 36]

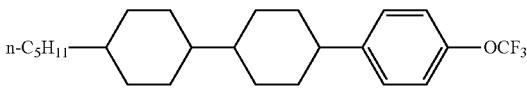
(20.8)

[Chem. 37]

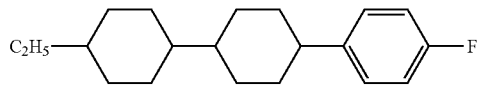
(20.4)

[Chem. 38]

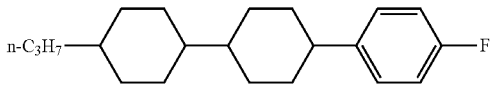
(20.5)

[Chem. 39]

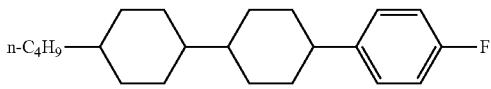
(20.6)

[Chem. 40]

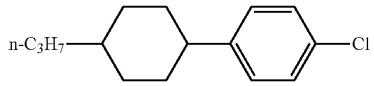
(20.7)

The component (A) may contain only one kind among these compounds or contain two or more kinds of the compounds. However, it is preferable to combine the compounds with each other appropriately, according to the required performance such as dielectric anisotropy, birefringence, or Tni. The component (A) contains preferably one to three kinds and more preferably one to four kinds among these compounds. It is particularly preferable for the component (A) to contain the compound represented by Formula (20.2), (20.7), or (20.8).

The content of the compounds represented by Formulae (20.1) to (20.3) and Formula (20.8) is preferably 2% by mass or more, more preferably 3% by mass or more, even more preferably 5% by mass or more, still more preferably 6% by mass or more, and yet more preferably 7% by mass or more, based on a total amount of the liquid crystal composition of the present invention. The upper limit of the content is preferably 25% by mass, more preferably 20% by mass, and even more preferably 15% by mass.

The content of the compounds represented by Formulae (20.4) to (20.6) is preferably 1% by mass or more, more preferably 2% by mass or more, and even more preferably 5% by mass or more, based on a total amount of the liquid crystal composition of the present invention. The upper limit of the content is preferably 25% by mass, more preferably 20% by mass, and even more preferably 15% by mass.

The content of the compound represented by Formula (20.7) is preferably 5% by mass or more, more preferably 7% by mass or more, and even more preferably 9% by mass or more, based on a total amount of the liquid crystal composition of the present invention. The upper limit of the content is preferably 25% by mass, more preferably 20% by mass, and even more preferably 15% by mass.

Specifically, the compounds represented by General formula (III) can contain compounds selected from a group of compounds represented by Formulae (7.1) to (7.4).

[Chem. 41]

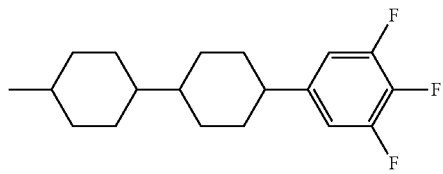
(7.1)

[Chem. 42]

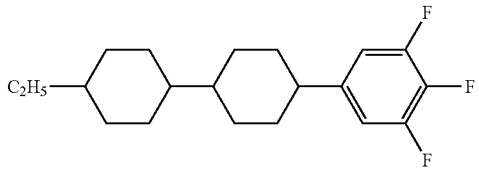
(7.2)

[Chem. 43]

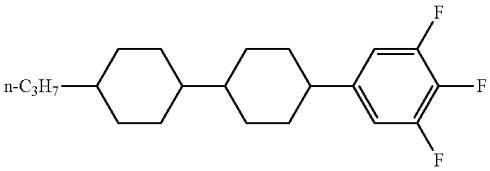
(7.3)

[Chem. 44]

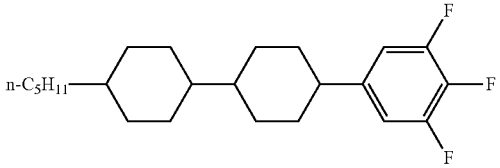
(7.4)

The component (A) may contain only one kind among these compounds or contain two or more kinds of the compounds. These compounds differ from each other in terms of the molecular weight depending on the structure of a terminal alkyl group. However, since the viscosity or Tni varies with the molecular weight, the content of the compounds are appropriately adjusted. The kind of compounds that can be combined with each other is not particularly limited. However, the component (A) contains preferably one to three kinds, more preferably one to four kinds among these compounds, in consideration of the required property such as dielectric anisotropy, birefringence, or Tni.

The content of the compounds represented by Formulae (7.1) to (7.4) is preferably 4% by mass or more, more preferably 8% by mass or more, and even more preferably 11% by mass or more, based on a total amount of the liquid crystal composition of the present invention. The upper limit of the content is preferably 30% by mass, more preferably 25% by mass, and even more preferably 20% by mass.

It is preferable for the dielectrically positive component (A) of the liquid crystal composition of the present invention to contain compounds represented by General formula (II).

[Chem. 45]

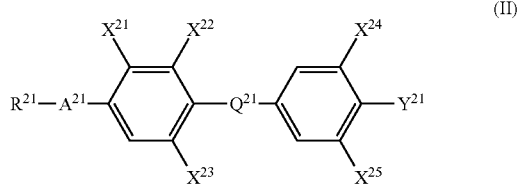

(II)

(In the formula, $R^{21}$ represents an alkyl group having 2 to 5 carbon atoms, each of $X^{21}$ to $X^{25}$ independently represents a fluorine atom or a hydrogen atom, $Q^{21}$ represents a single bond or —$CF_2O$—, $Y^{21}$ represents a fluorine atom or a —$OCF_3$, and $A^{21}$ represents a 1,4-phenylene group or a 1,4-cyclohexylene group.) The component (A) may contain only one kind among these compounds or contain two or more kinds of the compounds. However, it is preferable to combine the compounds with each other appropriately, according to the required performance such as dielectric anisotropy, birefringence, or Tni. The kind of compounds that can be combined with each other is not particularly limited. However, the component (A) preferably contains one to three kinds, more preferably one to four kinds, even more preferably one to five kinds, and particularly preferably one to six kinds among these compounds.

Specifically, the compounds represented by General formula (II) may be compounds selected from a group of compounds represented by Formulae (14.1) to (14.4).

[Chem. 46]

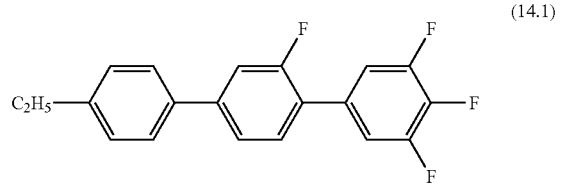

(14.1)

[Chem. 47]

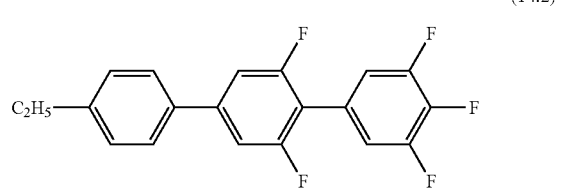

(14.2)

[Chem. 48]

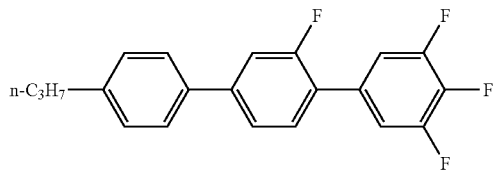

(14.3)

[Chem. 49]

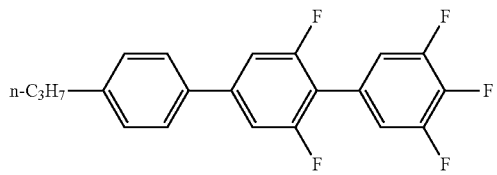

(14.4)

The kind of compounds that can be combined with each other is not particularly limited. However, the component (A) preferably contains one to three kinds among these compounds, in consideration of birefringence or Tni.

The content of the compounds represented by Formulae (14.1) to (14.4) is preferably 2% by mass or more, more preferably 5% by mass or more, and even more preferably 7% by mass or more, based on a total amount of the liquid crystal composition of the present invention. The upper limit of the content is preferably 20% by mass, more preferably 15% by mass, and even more preferably 10% by mass.

Specifically, the compounds represented by General formula (II) may be compounds selected from a group of compounds represented by Formulae (8.1) to (8.3).

[Chem. 50]

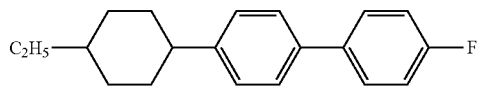

(8.1)

[Chem. 51]

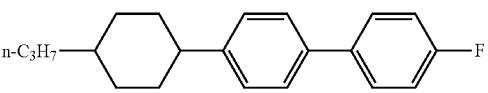

(8.2)

[Chem. 52]

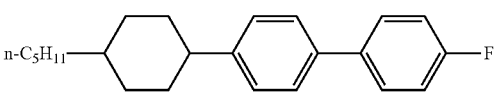

(8.3)

The content of the compounds represented by Formulae (8.1) to (8.3) is preferably 1% by mass or more, more preferably 2% by mass or more, and even more preferably 7% by mass or more, based on a total amount of the liquid crystal composition of the present invention. The upper limit of the content is preferably 20% by mass, more preferably 15% by mass, and even more preferably 10% by mass.

Specifically, the compounds represented by General formula (II) may be compounds selected from a group of compounds represented by Formulae (9.1) to (9.3).

[Chem. 53]

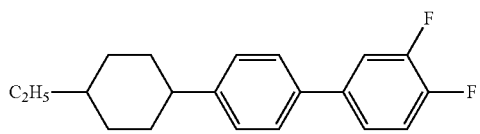

(9.1)

[Chem. 54]

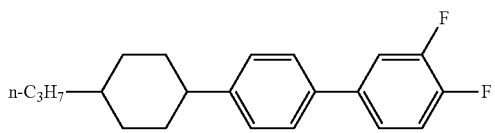

(9.2)

[Chem. 55]

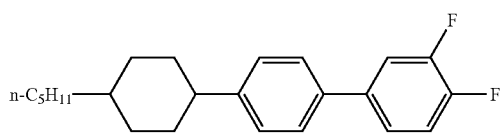

(9.3)

The kind of compounds that can be combined with each other is not particularly limited. However, the component (A) preferably contains one to three kinds among these compounds, in consideration of birefringence or Tni.

The content of the compounds represented by Formulae (9.1) to (9.3) is preferably 3% by mass or more, more preferably 6% by mass or more, and even more preferably 10% by mass or more, based on a total amount of the liquid crystal composition of the present invention. The upper limit of the content is preferably 30% by mass, more preferably 25% by mass, and even more preferably 20% by mass.

Specifically, the compounds represented by General formula (II) may be compounds selected from a group of compounds represented by Formulae (10.1) to (10.3).

[Chem. 56]

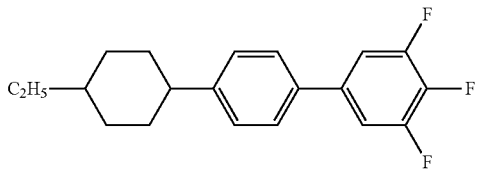

(10.1)

[Chem. 57]

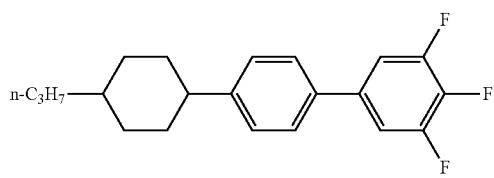

(10.2)

[Chem. 58]

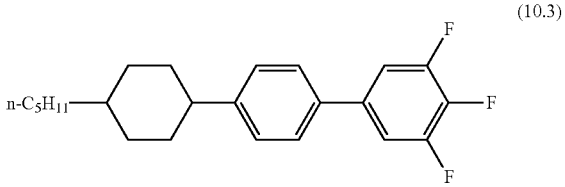

(10.3)

The kind of compounds that can be combined with each other is not particularly limited. However, the component (A) preferably contains one to three kinds among these compounds, in consideration of birefringence or Tni.

The content of the compounds represented by Formulae (10.1) to (10.3) is preferably 3% by mass or more, more preferably 5% by mass or more, even more preferably 8% by mass or more, still more preferably 9% by mass or more, yet more preferably 11% by mass or more, and particularly preferably 13% by mass or more, based on a total amount of the liquid crystal composition of the present invention. The upper limit of the content is preferably 35% by mass, more preferably 30% by mass, and even more preferably 25% by mass.

Specifically, the compounds represented by General formula (II) may be compounds selected from a group of compounds represented by Formulae (22.1) to (22.3).

[Chem. 59]

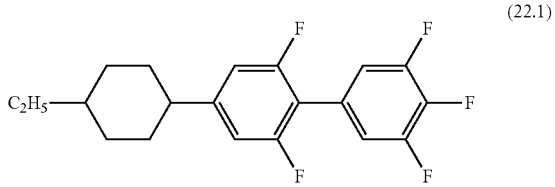

(22.1)

[Chem. 60]

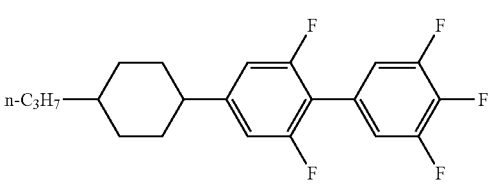

(22.2)

[Chem. 61]

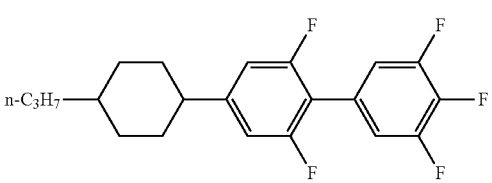

(22.3)

The content of the compounds represented by Formulae (22.1) to (22.3) is preferably 3% by mass or more, more preferably 6% by mass or more, and even more preferably 10% by mass or more, based on a total amount of the liquid crystal composition of the present invention. The upper limit of the content is preferably 25% by mass, more preferably 20% by mass, and even more preferably 16% by mass.

Specifically, the compounds represented by General formula (II) may be compounds selected from a group of compounds represented by Formula (23.1) or (23.2).

[Chem. 62]

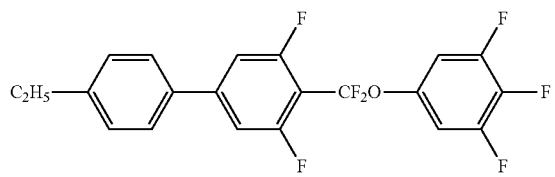

(23.1)

[Chem. 63]

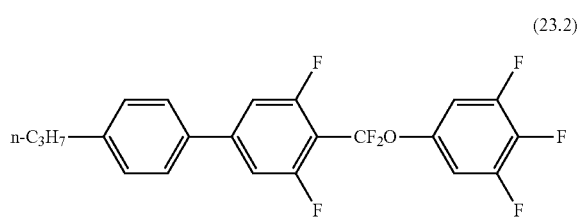

(23.2)

The content of the compounds represented by Formula (23.1) or (23.2) is preferably 1% by mass or more, more preferably 2% by mass or more, even more preferably 3% by mass or more, still more preferably 7% by mass or more, yet more preferably 9% by mass or more, more preferably 12% by mass or more, even more preferably 13% by mass or more, and still more preferably 15% by mass or more, based on a total amount of the liquid crystal composition of the present invention. The upper limit of the content is preferably 30% by mass, more preferably 25% by mass, and even more preferably 20% by mass.

The liquid crystal composition of the present invention contains a component (B) as a dielectrically neutral component. The dielectric anisotropy of the component (B) is greater than −2 and smaller than +2. Moreover, the component (B) contains compounds represented by Formula (2.1)

[Chem. 64]

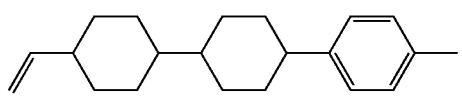

(2.1)

In the liquid crystal composition of the present invention, the content of the compound represented by Formula (2.1) is preferably 4% by mass, more preferably 6% by mass or more, even more preferably 8% by mass or more, still more preferably 14% by mass or more, yet more preferably 16% by mass or more, and particularly preferably 20% by mass or more, based on a total amount of the liquid crystal composition of the present invention.

The dielectrically neutral component (B) of the liquid crystal composition of the present invention preferably contains one, two, or more kinds of compounds represented by General formula (VI).

[Chem. 65]

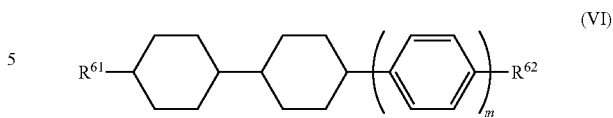

(VI)

(In the formula, each of $R^{61}$ and $R^{62}$ independently represents an alkyl group or alkoxy group having 1 to 5 carbon atoms or an alkenyl group having 3 to 5 carbon atoms, and m is 0 or 1.) The component (B) may contain only one kind among these compounds or contain two or more kinds thereof. However, it is preferable for the compounds to be combined with each other appropriately, according to the required refractive index anisotropy or solubility at room temperature or below freezing point. It is necessary to be careful since the solubility is influenced by the structure of alkyl groups of both terminals of the compound. The kind of compounds that can be combined with each other is not particularly limited. However, the component (B) contains preferably one to five kinds, more preferably one to four kinds, and particularly preferably one to three kinds among these compounds. Moreover, if the molecular weight distribution of the selected compounds is wide, this is effective for the solubility.

Specifically, the compounds represented by General formula (VI) are preferably compounds represented by Formulae (2.1) to (2.4).

[Chem. 66]

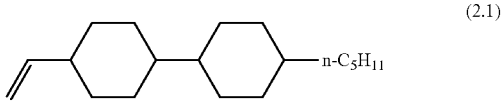

(2.1)

[Chem. 67]

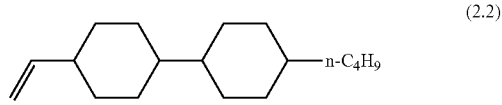

(2.2)

[Chem. 68]

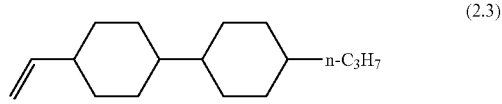

(2.3)

[Chem. 69]

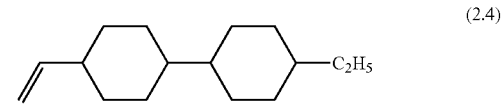

(2.4)

In the liquid crystal composition of the present invention, the content of the compounds represented by Formulae (2.1) to (2.4) is preferably 2% by mass, more preferably 6% by mass or more, even more preferably 10% by mass or more, still more preferably 15% by mass or more, and yet more preferably 22% by mass or more, based on a total amount of the liquid crystal composition of the present invention. The upper limit of the content is preferably 45% by mass, more preferably 40% by mass, and even more preferably 35% by mass. It is particularly preferable for the component (B) to contain the compound represented by Formula (2.1) or (2.2).

Specifically, the compounds represented by General formula (VI) are preferably compounds represented by Formulae (21.1) to (21.3)

[Chem. 70]

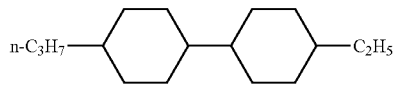
(21.1)

[Chem. 71]

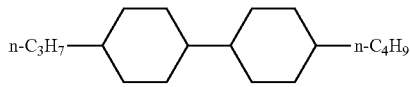
(21.2)

[Chem. 72]

(21.3)

In the liquid crystal composition of the present invention, the content of the compounds represented by Formulae (21.1) to (21.3) is preferably 3% by mass, more preferably 4% by mass or more, even more preferably 8% by mass or more, still more preferably 15% by mass or more, and yet more preferably 22% by mass or more, based on a total amount of the liquid crystal composition of the present invention. The upper limit of the content is preferably 40% by mass, more preferably 35% by mass, and even more preferably 30% by mass. It is particularly preferable to contain the compounds represented by Formula (21.2).

Specifically, the compounds represented by General formula (VI) may be compounds represented by Formulae (4.1) to (4.3).

[Chem. 73]

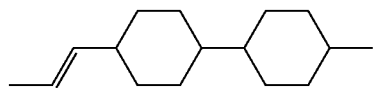
(4.1)

[Chem. 74]

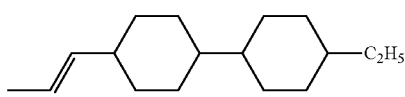
(4.2)

[Chem. 75]

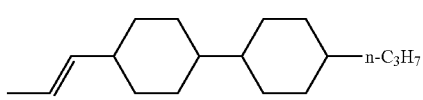
(4.3)

In the liquid crystal composition of the present invention, the content of the compounds represented by Formulae (4.1) to (4.3) is preferably 7% by mass, more preferably 8% by mass or more, even more preferably 9% by mass or more, still more preferably 11% by mass or more, yet more preferably 15% by mass or more, and particularly preferably 17% by mass or more, based on a total amount of the liquid crystal composition of the present invention. The upper limit of the content is preferably 35% by mass, more preferably 25% by mass, and even more preferably 20% by mass.

Specifically, the compounds represented by General formula (VI) are preferably compounds represented by Formula (3.3).

[Chem. 76]

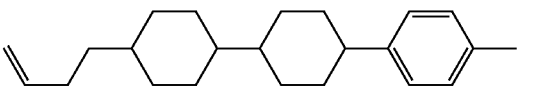
(3.3)

In the liquid crystal composition of the present invention, the content of the compounds represented by Formula (3.3) is preferably 5% by mass, more preferably 8% by mass or more, even more preferably 10% by mass or more, still more preferably 12% by mass or more, yet more preferably 14% by mass or more, and particularly preferably 16% by mass or more, based on a total amount of the liquid crystal composition of the present invention. The upper limit of the content is preferably 35% by mass, more preferably 25% by mass, and even more preferably 20% by mass.

Specifically, the compounds represented by General formula (VI) may be compounds selected from a group of compounds represented by Formulae (16.4) to (16.6).

[Chem. 77]

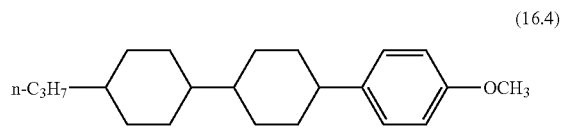
(16.4)

[Chem. 78]

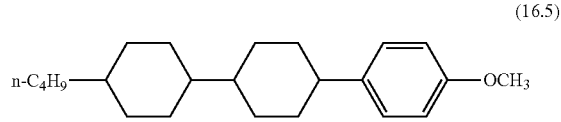
(16.5)

[Chem. 79]

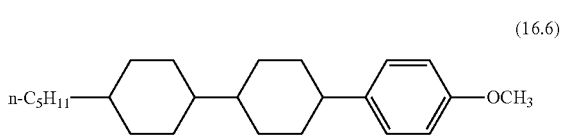
(16.6)

In the liquid crystal composition of the present invention, the content of the compounds represented by Formulae (16.4) to (16.6) is preferably 4% by mass, more preferably 7% by mass or more, even more preferably 10% by mass or more, and still more preferably 15% by mass or more, based on a total amount of the liquid crystal composition of the present invention. The upper limit of the content is preferably 35% by mass, more preferably 25% by mass, and even more preferably 20% by mass.

The dielectrically neutral component (B) of the liquid crystal composition of the present invention can further contain one, two, or more kinds of compounds represented by General formula (VII).

[Chem. 80]

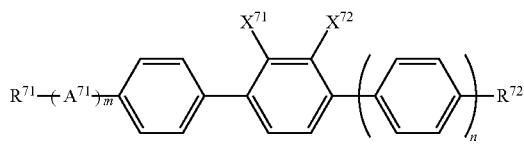
(VII)

(In the formula, each of $R^{71}$ and $R^{72}$ independently represents an alkyl group or alkenyl group having 2 to 5 carbon atoms, each of $X^{71}$ or $X^{72}$ independently represents a fluorine atom or a hydrogen atom, $A^{71}$ represents a 1,4-cyclohexylene group, and each of m and n independently represents 0 or 1.) Among the compounds represented by General formula (VII), the kind of compounds that can be combined with each other is not particularly limited. However, in consideration of birefringence or Tni, the component (B) contains preferably one to three kinds, more preferably one to four kinds, even more preferably one to five kinds, and still more preferably one to six kinds among these compounds.

Specifically, the compounds represented by General formula (VII) may be compounds selected from a group of compounds represented by Formulae (9.1) to (9.3).

[Chem. 81]

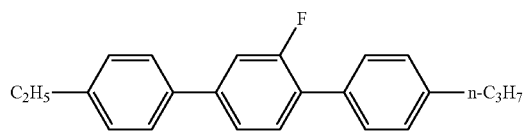
(9.1)

[Chem. 82]

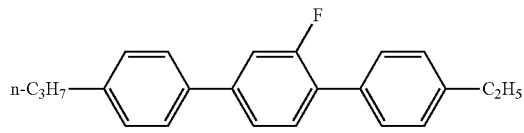
(9.2)

[Chem. 83]

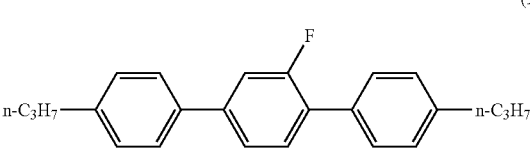
(9.3)

In the liquid crystal composition of the present invention, the content of the compounds represented by Formulae (9.1) to (9.3) is preferably 2% by mass, more preferably 3% by mass or more, even more preferably 5% by mass or more, and still more preferably 10% by mass or more, based on a total amount of the liquid crystal composition of the present invention. The upper limit of the content is preferably 30% by mass, more preferably 20% by mass, and even more preferably 16% by mass.

Specifically, the compounds represented by General formula (VII) are preferably compounds selected from a group of compounds represented by Formulae (10.1) to (10.8).

[Chem. 84]

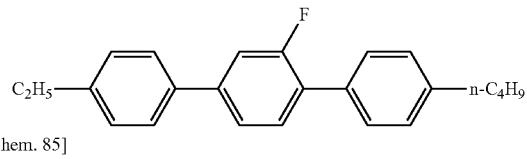
(10.1)

[Chem. 85]

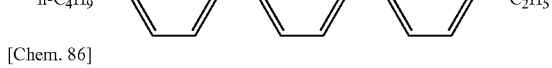
(10.2)

[Chem. 86]

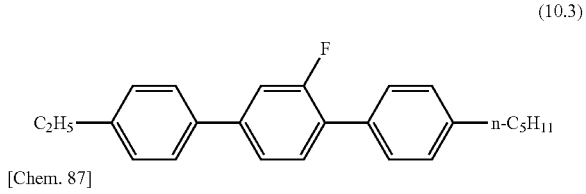
(10.3)

[Chem. 87]

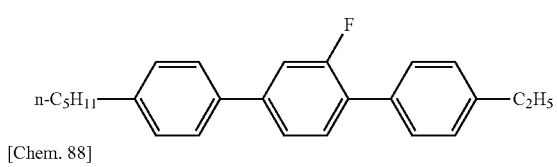
(10.4)

[Chem. 88]

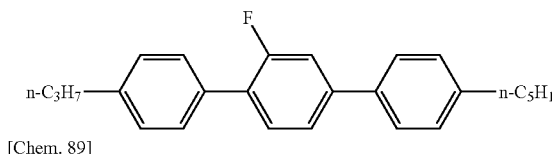
(10.5)

[Chem. 89]

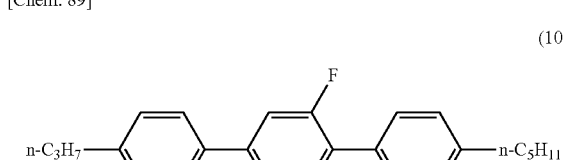
(10.6)

[Chem. 90]

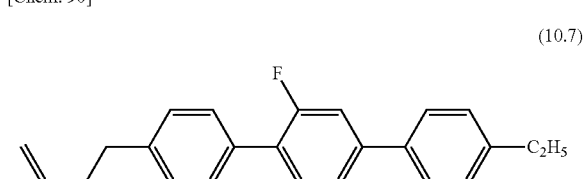
(10.7)

[Chem. 91]

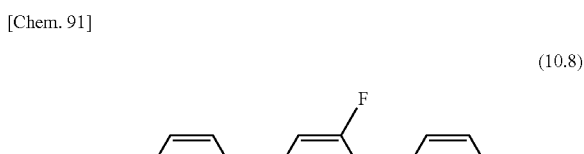
(10.8)

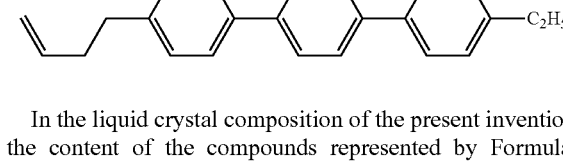

In the liquid crystal composition of the present invention, the content of the compounds represented by Formulae (10.1) to (10.6) is preferably 2% by mass, more preferably 3% by mass or more, even more preferably 5% by mass or more, and still more preferably 10% by mass or more, based on a total amount of the liquid crystal composition of the present invention. The upper limit of the content is preferably 30% by mass, more preferably 20% by mass, and even more preferably 16% by mass.

In the liquid crystal composition of the present invention, the content of the compounds represented by Formulae (10.7) and (10.8) is preferably 1% by mass, more preferably 2% by mass or more, even more preferably 4% by mass or more, and still more preferably 8% by mass or more, based on a total amount of the liquid crystal composition of the present invention. The upper limit of the content is preferably 30% by mass, more preferably 20% by mass, and even more preferably 16% by mass. It is particularly preferable for the component (B) to contain the compound represented by Formula (10.7) or (10.8).

Specifically, the compounds represented by General formula (VII) are preferably compounds selected from a group of compounds represented by Formulae (13.1) to (13.8).

[Chem. 92]

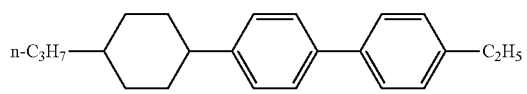
(13.1)

[Chem. 93]

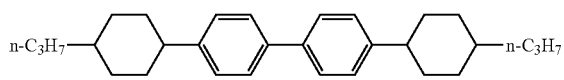
(13.2)

[Chem. 94]

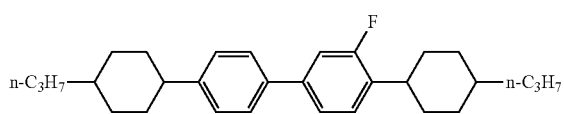
(13.3)

[Chem. 95]

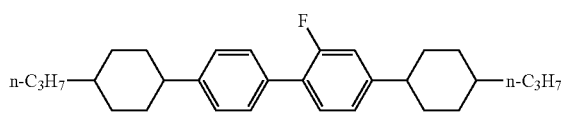
(13.4)

[Chem. 96]

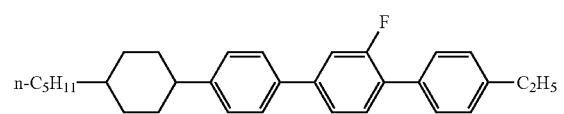
(13.5)

[Chem. 97]

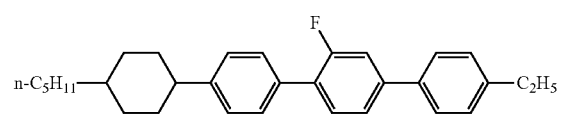
(13.6)

[Chem. 98]

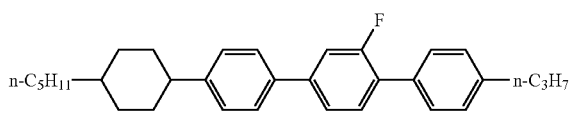
(13.7)

[Chem. 99]

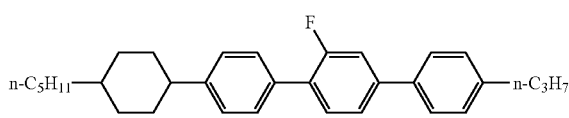
(13.8)

The component (B) may contain only one kind among these compounds or contain two or more kinds thereof. However, it is preferable for the compounds to be appropriately combined with each other, according to the required refractive index anisotropy or solubility at room temperature and below freezing point. It is necessary to be careful since the solubility is influenced by the structure of alkyl groups of both terminals of the compound. The kind of compounds that can be combined with each other is not particularly limited. However, the component (B) contains preferably one to five kinds, more preferably one to four kinds, and particularly preferably one to three kinds among these compounds. Moreover, if the molecular weight distribution of the selected compounds is wide, this is effective for the solubility.

In the liquid crystal composition of the present invention, the content of the compounds represented by Formulae (13.1) to (13.4) is preferably 1% by mass, more preferably 2% by mass or more, even more preferably 4% by mass or more, and still more preferably 8% by mass or more, based on a total amount of the liquid crystal composition of the present invention. The upper limit of the content is preferably 30% by mass, more preferably 20% by mass, and even more preferably 16% by mass.

In the liquid crystal composition of the present invention, the content of the compounds represented by Formulae (13.5) to (13.8) is preferably 3% by mass, more preferably 4% by mass or more, even more preferably 6% by mass or more, still more preferably 8% by mass or more, yet more preferably 9% by mass or more, and particularly preferably 10% by mass or more, based on a total amount of the liquid crystal composition of the present invention. The upper limit of the content is preferably 30% by mass, more preferably 20% by mass, and even more preferably 16% by mass. It is preferable for the component (B) to contain one kind among Formulae (13.5) and (13.6) and one kind among Formulae (13.7) and (13.8).

Specifically, as the compounds represented by General formula (VII), compounds represented by Formulae (15.1) to (15.3) are preferably used.

[Chem. 100]

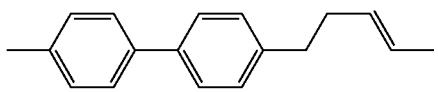
(15.1)

[Chem. 101]

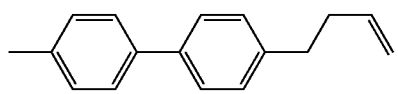
(15.2)

[Chem. 102]

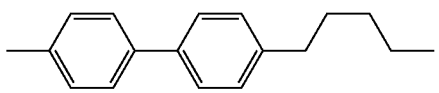
(15.3)

In the liquid crystal composition of the present invention, the content of the compounds represented by Formulae (15.1) to (15.3) is preferably 4% by mass, more preferably 6% by mass or more, even more preferably 10% by mass or more, still more preferably 15% by mass or more, and yet more preferably 18% by mass or more, based on a total amount of the liquid crystal composition of the present invention. The upper limit of the content is preferably 35% by mass, more preferably 25% by mass, and even more preferably 20% by mass. It is particularly preferable for the component (B) to contain the compound represented by Formula (15.2).

Moreover, the dielectrically neutral component (B) of the liquid crystal composition of the present invention preferably contains one, two, or more kinds of compounds represented by General formula (X).

[Chem. 103]

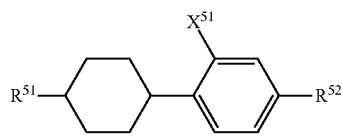
(X)

(In the formula, each of $R^{51}$ and $R^{52}$ independently represents an alkyl group or alkoxy group having 2 to 5 carbon atoms, and $X^{51}$ represents a fluorine atom or a hydrogen atom.) The kind of compounds that can be combined with each other is not particularly limited. However, the component (B) contains preferably one to three kinds, more preferably one to four kinds, even more preferably one to five kinds, and particularly preferably one to six kinds among these compounds, in consideration of birefringence or Tni. Specifically, as the compounds represented by General formula (X), compounds represented by Formulae (16.1) to (16.3) are preferably used.

[Chem. 104]

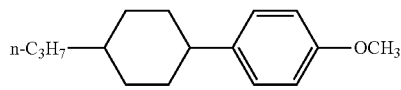
(16.1)

[Chem. 105]

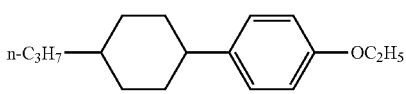
(16.2)

[Chem. 106]

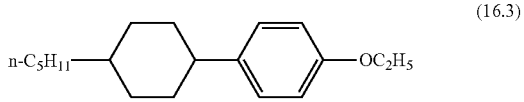
(16.3)

In the liquid crystal composition of the present invention, the content of the compounds represented by Formulae (16.1) to (16.3) is preferably 4% by mass, more preferably 7% by mass or more, even more preferably 10% by mass or more, and still more preferably 15% by mass or more, based on a total amount of the liquid crystal composition of the present invention. The upper limit of the content is preferably 35% by mass, more preferably 25% by mass, and even more preferably 20% by mass.

It is particularly preferable for the compounds represented by General formula (X) are compounds represented by Formula (16.1)

The dielectrically neutral component (B) of the liquid crystal composition of the invention of the present application preferably further contains compounds represented by General formula (IV).

[Chem. 107]

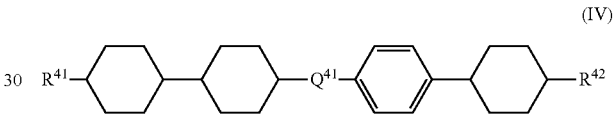
(IV)

(In the formula, each of $R^{41}$ and $R^{41}$ independently represents an alkyl group having 2 to 5 carbon atoms, and $Q^{41}$ represents a single bond, —COO—, or —CH$_2$CH$_2$—.) The kind of compounds that can be combined with each other is not particularly limited. However, the component (B) contains preferably one to three kinds among these compounds, in consideration of birefringence or Tni. The content of the compounds represented by General formula (IV) is preferably 1% by mass, more preferably 2% by mass or more, even more preferably 3% by mass or more, still more preferably 5% by mass or more, yet more preferably 7% by mass or more, and particularly preferably 9% by mass or more, based on a total amount of the liquid crystal composition of the present invention. The upper limit of the content is preferably 25% by mass, more preferably 20% by mass, and even more preferably 15% by mass.

Specifically, the compounds represented by General formula (IV) are preferably compounds selected from a group of compounds represented by Formulae (17.1) to (17.3).

[Chem. 108]

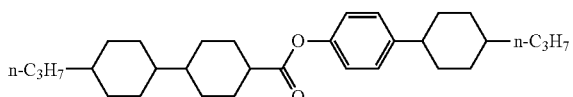
(17.1)

[Chem. 109]

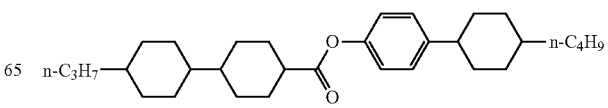
(17.2)

[Chem. 110]

(17.3)

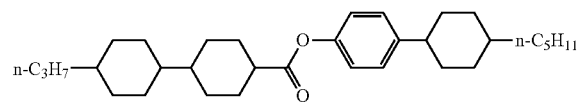

The kind of compounds that can be combined with each other is not particularly limited. However, it is preferable for the compounds to be used by being appropriately combined with each other in consideration of Tni, solubility, and Δn. Particularly, it is preferable to use one kind of the compound or use a combination of two to three kinds of the compounds.

In the liquid crystal composition of the present invention, the content of the compounds which constitute the component (B) and are represented by Formulae (17.1) to (17.3) is preferably 1% by mass, more preferably 2% by mass or more, even more preferably 3% by mass or more, still more preferably 5% by mass or more, yet more preferably 7% by mass or more, and particularly preferably 9% by mass or more, based on a total amount of the liquid crystal composition of the present invention. The upper limit of the content is preferably 25% by mass, more preferably 20% by mass, and even more preferably 15% by mass. The compounds represented by General formula (IV) are particularly preferably the compound represented by Formula (17.1).

The dielectrically neutral component (B) of the liquid crystal composition of the invention of the present application can further contain compounds selected from a group of compounds represented by Formula (3.1).

[Chem. 111]

(3.1)

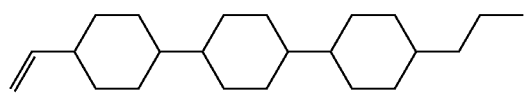

The liquid crystal composition of the invention of the present application can also contain compounds represented by Formula (2.5).

[Chem. 112]

(2.5)

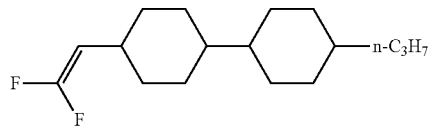

The dielectrically neutral component (B) of the liquid crystal composition of the present invention can further contain compounds represented by General formula (VIII).

[Chem. 113]

(VIII)

(In the formula, each of $R^1$ and $R^2$ independently represents a linear alkyl or linear alkenyl group having 1 to 10 carbon atoms.) The component (B) may contain only one kind among these compounds or contain two or more kinds thereof. However, it is preferable to combine the compounds with each other appropriately according to the required performance. The kind of compounds that can be combined with each other is not particularly limited. However, the component (B) contains preferably one to three kinds, more preferably one to five kinds, and particularly preferably one to eight kinds among these compounds.

Specifically, as the compounds represented by General formula (VIII), compounds exemplified below can be preferably used.

[Chem. 114]

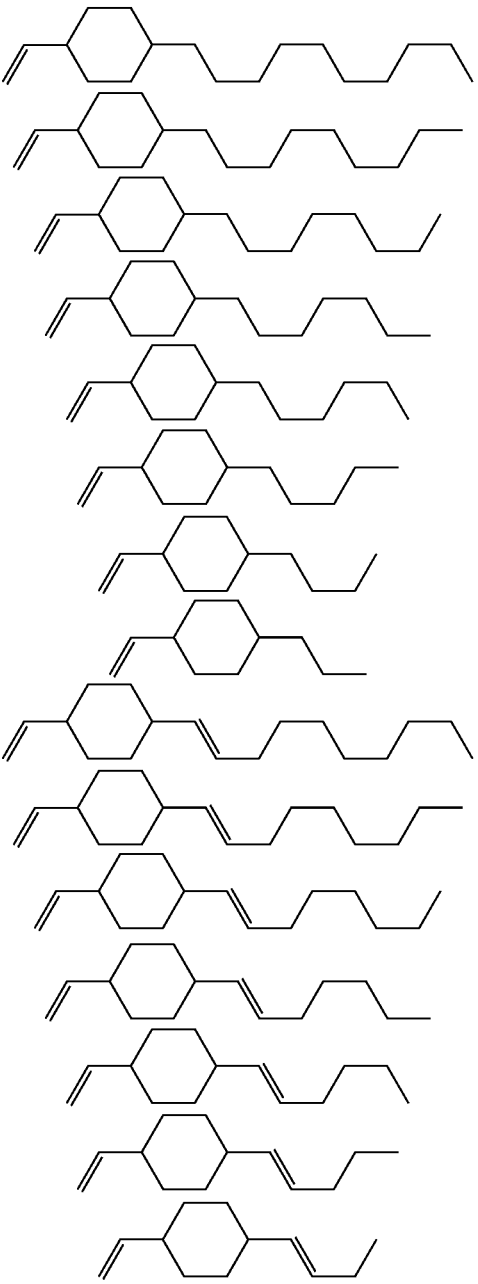

-continued
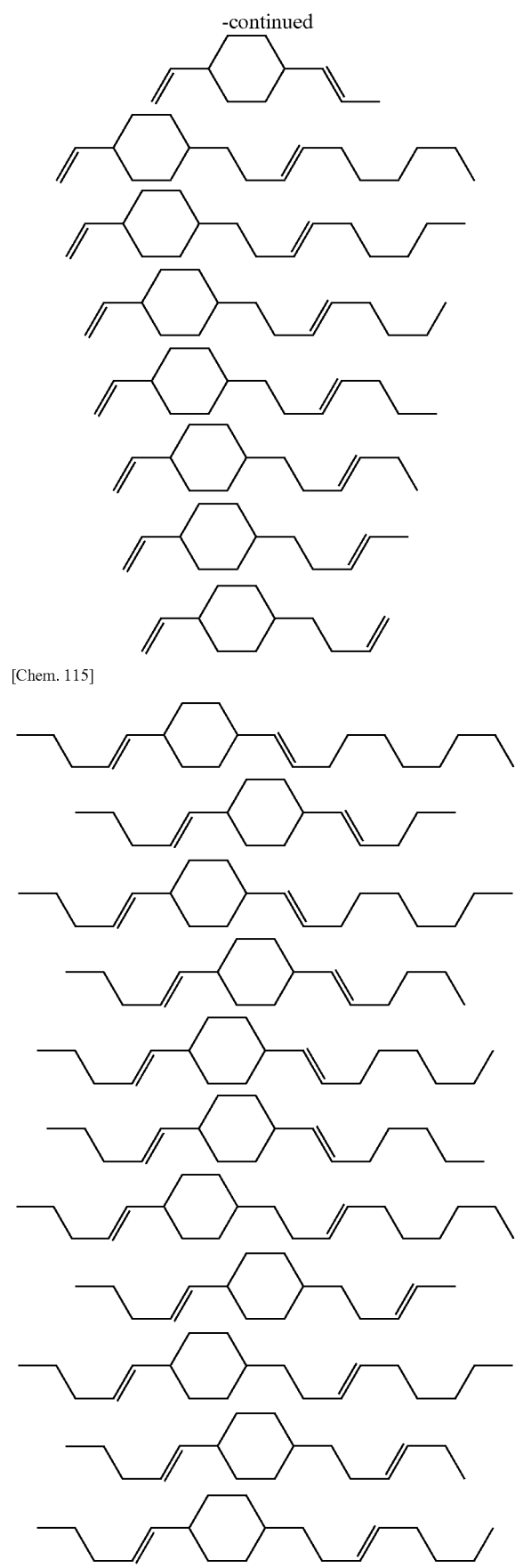
[Chem. 115]
-continued
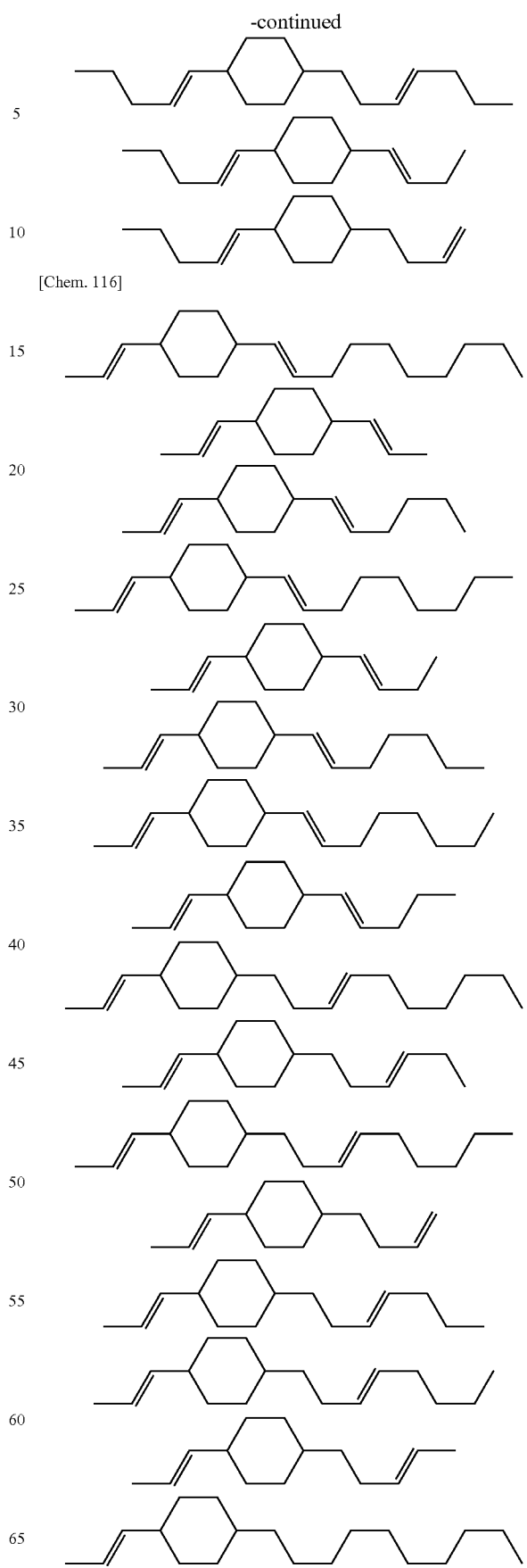
[Chem. 116]

-continued

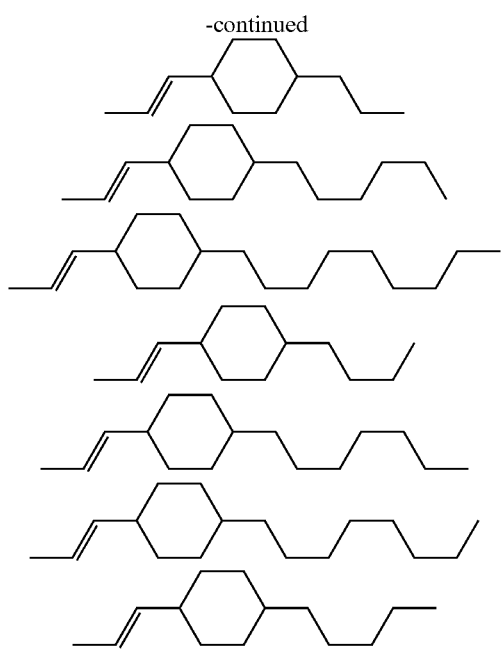

[Chem. 117]

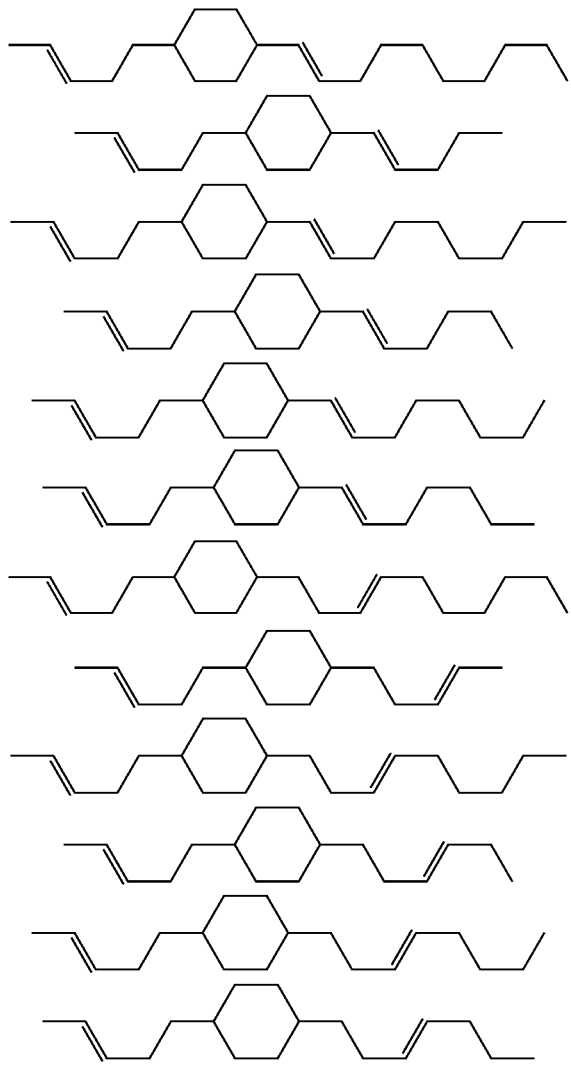

-continued

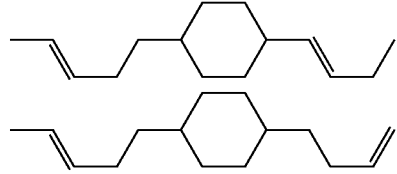

The dielectrically neutral component (B) of the liquid crystal composition of the invention of the present application can further contain compounds represented by General formula (IX).

[Chem. 118]

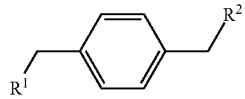

(IX)

(In the formula, each of $R_1$ and $R_2$ independently represents a linear alkyl or linear alkenyl group having 1 to 10 carbon atoms.) The kind of compounds that can be combined with each other is not particularly limited. However, in consideration of refractive index anisotropy or Tni, the component (B) preferably contains one to four kinds and more preferably one to three kinds among these compounds. Specifically, as the compounds represented by General formula (IX), compounds exemplified below can be preferably used.

[Chem. 119]

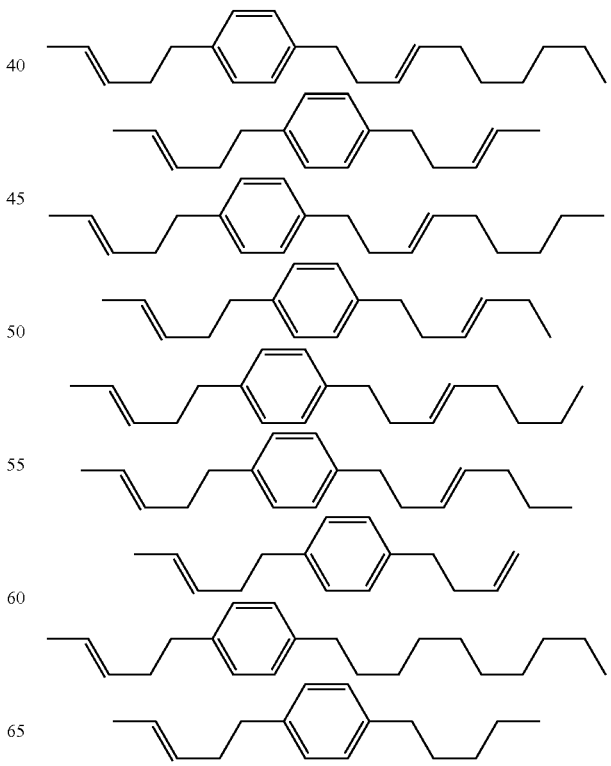

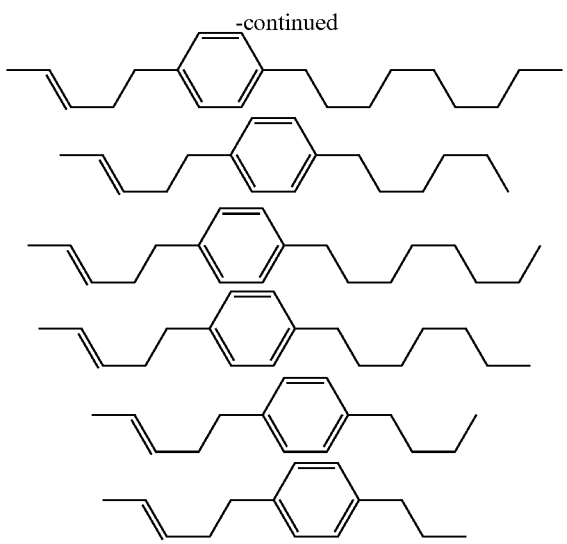

The liquid crystal composition of the present invention is preferably used even when the composition contains the component (A) in an amount of 73% by mass or more or when it contains the component (B) in an amount of 81% by mass or more.

Δ∈ at 25° C. of the liquid crystal composition of the present invention is +3.5 or greater. However, the Δ∈ at 25° C. thereof is preferably +3.5 to +20.0 and more preferably +3.5 to +15.0. Δn at 25° C. thereof is 0.08 to 0.14. However, the Δn at 25° C. thereof is more preferably 0.09 to 0.13. Specifically, in order to deal with a thin cell gap, the Δn is preferably 0.10 to 0.13, and in order to deal with a thick cell gap, the Δn is preferably 0.08 to 0.10. η at 20° C. of the liquid crystal composition is 10 mPa·s to 45 mPa·s. However, the η is preferably 10 mPa·s to 25 mPa·s, and particularly preferably 10 mPa·s to 20 mPa·s. Tni of the liquid crystal composition is 60° C. to 120° C. However, the Tni is more preferably 70° C. to 110° C. and particularly preferably 75° C. to 90° C.

The liquid crystal composition of the present invention may contain general nematic liquid crystals, smectic liquid crystals, cholesteric liquid crystals, and the like, in addition to the above compounds.

The liquid crystal composition of the present invention can contain polymerizable compounds to prepare liquid crystal display devices using a PS mode, a transverse electrical field-type PSA mode, a transverse electrical field-type PSVA mode, and the like. Examples of usable polymerizable compounds include photopolymerizable monomers and the like that are polymerized by energy rays such as light. Regarding the structure of the compounds, examples of the polymerizable compounds include biphenyl derivatives, terphenyl derivatives, and the like having a liquid crystal skeleton in which plural six-membered rings are connected to each other. Specifically, bifunctional monomers represented by General formula (V) are preferable.

[Chem. 120]

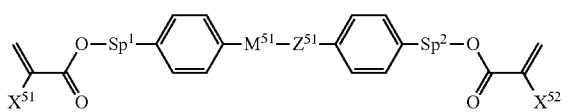

(V)

(In the formula, each of $X^{51}$ and $X^{52}$ independently represents a hydrogen atom or a methyl group, each of $Sp^1$ and $Sp^2$ independently represents a single bond, an alkylene group having 1 to 8 carbon atoms, —O—$(CH_2)_s$— (in the formula, s represents an integer of 2 to 7, and an oxygen atom binds to an aromatic ring), $Z^{51}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$—(in the formula, each of $Y^1$ and $Y^2$ independently represents a fluorine atom or a hydrogen atom), —C≡C— or a single bond, $M^{51}$ represents a 1,4-phenylene group, a trans-1,4-cyclohexylene group, or a single bond, and in all the 1,4-phenylene groups in this formula, any hydrogen atom may be substituted with a fluorine atom.)

Any of diacrylate derivatives in which all of $X^{51}$ and $X^{52}$ represent hydrogen atoms and dimethacrylate derivatives in which all of $X^{51}$ and $X^{52}$ represent methyl groups are preferable. Moreover, compounds in which one of $X^{51}$ and $X^{52}$ represents a hydrogen atom and the other represents a methyl group are also preferable. Regarding the polymerization speed of these compounds, diacrylate derivatives are polymerized most rapidly, dimethacrylate derivatives are polymerized slowly, and asymmetric compounds are polymerized at the medium speed. It is possible to use preferable embodiments according to the use of the compound. For PSA display devices, dimethacrylate derivatives are particularly preferable.

Each of $Sp^1$ and $Sp^2$ independently represents a single bond, an alkylene group having 1 to 8 carbon atoms, or —O—$(CH_2)_s$—. However, for a PSA display device, it is preferable for at least one of $Sp^1$ and $Sp^2$ to be a single bond. Moreover, a compound in which both the $Sp^1$ and $Sp^2$ represent single bonds or an embodiment in which one of $Sp^1$ and $Sp^2$ is single bond and the other represents an alkylene group having 1 to 8 carbon atoms or —O—$(CH_2)_s$— is preferable. In this case, an alkyl group having 1 to 4 is preferable, and s is preferably 1 to 4.

$Z^{51}$ is preferably —$OCH_2$—, —$CH_2O$—, —COO—, —OCO—, —$CF_2O$—, —$OCF_2$—, —$CH_2CH_2$—, —$CF_2CF_2$—, or a single bond, more preferably —COO—, —OCO—, or a single bond, and particularly preferably a single bond.

$M^{51}$ represents a 1,4-phenylene group in which any of hydrogen atoms may be substituted with a fluorine atom, a trans-1,4-cyclohexylene group, or a single bond. However, $M^{51}$ is preferably a 1,4-phenylene group or a single bond. When C represents a ring structure other than a single bond, $Z^{51}$ is also preferably a linking group other than a single bond. When $M^{51}$ is a single bond, $Z^{51}$ is preferably a single bond.

From the viewpoint described above, in General formula (V), it is preferable for the ring structure between Sp1 and Sp2 to specifically have the following structure.

In General formula (V), when $M^{51}$ represents a single bond, and the ring structure is formed of two rings, the ring structure is represented preferably by Formulae (Va-1) to (Va-5), more preferably by Formulae (Va-1) to (Va-3), and particularly preferably by Formula (Va-1).

[Chem. 121]

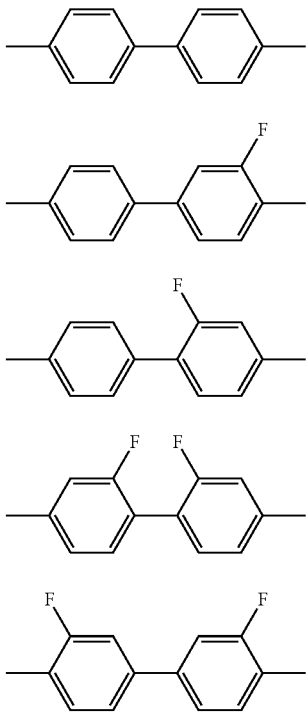

(Va-1)
(Va-2)
(Va-3)
(Va-4)
(Va-5)

(In the formulae, both ends bind to Sp¹ or Sp².)

Anchoring force obtained after polymerization of these polymerizable compounds having the above skeleton is optimal for the PSA-type liquid crystal display device, whereby an excellent alignment state is obtained. Accordingly, display unevenness is suppressed or does not occur at all.

For the above reasons, as the polymerizable monomers, General formulae (V-1) to (V-4) are particularly preferable, and among these, General formula (V-2) is most preferable.

[Chem. 122]

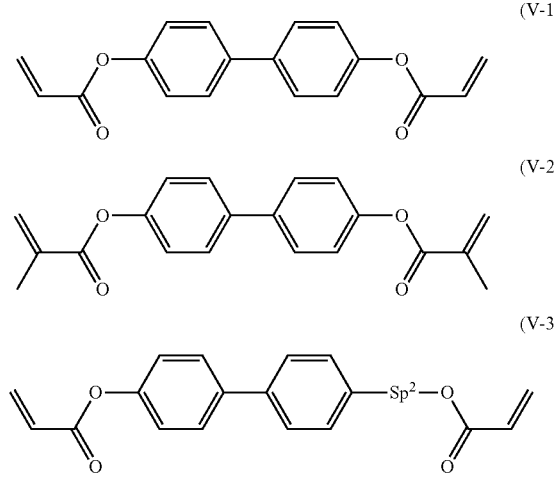

(V-1)
(V-2)
(V-3)

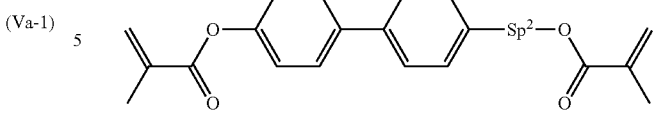

(V-4)

(In the formulae, $Sp^2$ represents an alkylene group having 2 to 5 carbon atoms.)

When the monomer is added to the liquid crystal composition of the present invention, polymerization proceeds even if a polymerization initiator is not used. However, in order to accelerate polymerization, the liquid crystal composition may contain a polymerization initiator. Examples of the polymerization initiator include benzoin ethers, benzophenones, acetophenones, benzyl ketals, acyl phosphine oxides, and the like.

In the liquid crystal composition of the present invention that contains the polymerizable compound, the polymerizable compound is polymerized by being irradiated with UV rays. As a result, the liquid crystal composition obtains an ability to align liquid crystals and is used for liquid crystal display devices that control the amount of transmitted light by utilizing birefringence of the liquid crystal composition. The liquid crystal composition is useful for liquid crystal display devices such as Active Matrix-Liquid Crystal Display (AM-LCD), Nematic liquid crystal display (TN), Super Twisted Nematic-Liquid Crystal Display (STN-LCD), OCB-LCD, and In-Plane Switching-Liquid Crystal Display (IPS-LCD). The liquid crystal composition is particularly useful for an AM-LCD and can be used for transmissive or reflective liquid crystal display devices.

For two sheets of substrates of liquid crystal cells used in a liquid crystal display device, flexible and transparent materials such as glass or plastic can be used. One of the substrates may be formed of an opaque material such as silicon. A transparent substrate having a transparent electrode layer can be obtained by, for example, performing sputtering of Indium Tin Oxide (ITO) on a transparent substrate such as glass plate.

A color filter can be prepared by, for example, a pigment dispersion method, a printing method, an electrodeposition method, a staining method, and the like. For example, in a method of preparing a color filter by means of a pigment dispersion method, a curable coloring composition for a color filter is coated onto the transparent substrate, and the substrate is subjected to patterning treatment and then cured by heating or light irradiation. If this process is performed for three colors including red, green, and blue respectively, pixel portions for a color filter can be prepared. Furthermore, TFT, a thin-film diode, and a pixel electrode including active elements such as a metallic insulator and a metallic resistive element may be disposed on the substrate.

The substrates are caused to face each other such that the transparent electrode layer becomes the inner side. At this time, the space between the substrates may be adjusted through a spacer, and it is preferable to adjust the thickness of the obtained dimming layer to 1 μm to 100 μm. The thickness is more preferably 1.5 μm to 10 μm. When a polarizing plate is used, it is preferable to adjust the product of the refractive index anisotropy Δn of the liquid crystals and a cell thickness d such that the contrast becomes maximal. Moreover, when two polarizing plates are used, it is also possible to adjust a viewing angle or the contrast to an excellent level by means of adjusting a polarizing axis of each of the polarizing plates. In addition, a retardation film for enlarging the viewing angle can also be used. Examples of the spacer include columnar spacers and the like formed of glass particles, plastic particles, alumina particles, photoresist materials, and the like. Thereafter, a sealant such as an epoxy-based thermosetting composition is screen-printed on the substrate in a state where a liquid crystal-filling hole has been formed, the substrates are pasted together, and the sealant is thermally-cured by heating.

As a method of interposing the polymerizable compound-containing liquid crystal composition between two substrates, the general vacuum fill process, the ODF process, or the like can be used. In the vacuum fill process, dropping marks are not caused, but this process has a problem that a trace of filling is left. The invention of the present application can be more preferably used for display devices that are produced using the ODF process. In the liquid crystal display device production process using the ODF process, an epoxy-based sealant or the like that is curable by both the light and heat is used to drawing a form of bank having a shape of closed loop on one of the substrates as a back plane and the substrate as a front plane by using a dispenser. During this process, the liquid crystal composition is dropped in a predetermined amount onto the substrate under deaeration, and the front plane is bonded to the back plane, whereby a liquid crystal display device can be produced. The liquid crystal composition of the present invention can be preferably used since this composition can be stably dropped during the ODF process.

In order to obtain an excellent liquid crystal-alignment performance, an appropriate polymerization speed is desired. Accordingly, as the method of polymerizing the polymerizable compound, a method is preferable in which the compound is polymerized by being irradiated with one kind of actinic energy rays such as UV rays or electron beams or with both of them, or by being sequentially irradiated with those actinic energy rays. When UV rays are used, a polarized light source or a non-polarized light source may be used. Moreover, when the polymerization is performed in a state where the polymerizable compound-containing liquid crystal composition has been interposed between two substrates, at least the substrate at the side to be irradiated should be made exhibit appropriate transparency with respect to the actinic energy rays. In addition, a method may also be used in which only a certain portion is polymerized by using a mask during the light irradiation, conditions such as an electric field, a magnetic field, and temperature are then changed to change the alignment state of the unpolymerized portion, and polymerization is performed again by the irradiation of actinic energy rays. Particularly, when light exposure is performed using UV rays, it is preferable to perform the light exposure by using UV rays while applying an alternating electric field to the polymerizable compound-containing liquid crystal composition. For the alternating electric field to be applied, an alternating current having a frequency of 10 Hz to 10 kHz is preferable, and an alternating current having a frequency of 60 Hz to 10 kHz is more preferable. The voltage is selected depending on a desired pretilt angle of the liquid crystal display device. That is, the pretilt angle of the liquid crystal display device can be controlled by the voltage to be applied. In a liquid crystal display device using a transverse electric filed-type MVA mode, in view of alignment stability and contrast, it is preferable to control the pretilt angle to be 80° to 89.9°.

The temperature at the time of irradiation is preferably within a temperature range in which the liquid crystal composition of the present invention maintains in the liquid crystal state. It is preferable for the polymerizable compound to be polymerized at temperature close to room temperature, that is, typically at a temperature of 15° C. to 35° C. As a lamp emitting UV rays, a metal halide lamp, a high-pressure mercury lamp, an ultrahigh-pressure mercury lamp, and the like can be used. Regarding the wavelength of the UV rays used for irradiation, it is preferable to perform irradiation by using UV rays having a wavelength region not included in the absorption wavelength region of the liquid crystal composition. Optionally, it is preferable to use UV rays by cutting the rays. The intensity of the UV rays for irradiation is preferably 0.1 mW/cm2 to 100 W/cm2, and more preferably 2 mW/cm2 to 50 W/cm2. The amount of energy of UV rays for irradiation can be appropriately adjusted, but it is preferably 10 mJ/cm2 to 500 J/cm2, and more preferably 100 mJ/cm2 to 200 J/cm2. At the time of irradiation of UV rays, the intensity may be varied. The time of UV irradiation is appropriately varied with the intensity of the UV rays used for irradiation. However, the time is preferably 10 seconds to 3,600 seconds, and more preferably 10 seconds to 600 seconds.

The liquid crystal display device using the liquid crystal composition of the present invention is a useful device in which both the high-speed responsiveness and suppression of display defectiveness are realized. Particularly, the liquid crystal display device is applicable to an active matrix driving liquid crystal display device and liquid crystal display devices for a VA mode, a PSVA mode, a PSA mode, an IPS mode, or an ECB mode.

Hereinafter, preferable embodiments of the liquid crystal display device according to the present invention will be described in detail with reference to drawings.

FIG. 1 is a cross-sectional view of a liquid crystal display device including two substrates facing each other, a sealant disposed between the two substrates, and liquid crystals sealed in a sealed area surrounded by the sealant.

Specifically, FIG. 1 shows a specific embodiment of a liquid crystal display device including a back plane that is constituted with a TFT layer 102 and a pixel electrode 103 disposed on a substrate a 100 as well as a passivation layer 104 and an alignment layer a 105 disposed on the above constituents; a front plane that is caused to face the back plane and constituted with a black matrix 202, a color filter 203, a planarizing layer (overcoat layer) 201, and a transparent electrode 204 disposed on a substrate b 200 as well as a alignment layer b 205 disposed on the above constituents; a sealant 301 disposed between the above two substrates; and a liquid crystal layer 303 sealed in a sealed area surrounded by the sealant, in which a projection 304 is disposed on the surface of the substrate that comes into contact with the sealant 301.

The material of the substrate a or the substrate b is not particularly limited as long as the material is substantially transparent, and it is possible to use glass, ceramics, plastic, and the like. As a plastic substrate, cellulose derivatives such as cellulose, triacetyl cellulose, and diacetyl cellulose, polycycloolefin derivatives, polyesters such as polyethylene terephthalate and polyethylene naphthalate, polyoelfins such as polypropylene and polyethylene, polycarbonate, polyvinyl alcohol, polyvinyl chloride, polyvinylidene chloride, polyamide, polyimide, polyimide amide, polystyrene, polyacrylate, polymethyl methacrylate, polyether sulfone, polyarylate, organic-inorganic composite materials such as glass fiber-epoxy resin and glass fiber-acrylic resin, and the like can be used.

When a plastic substrate is used, it is preferable to dispose a barrier film on the substrate. The barrier film functions to decrease hygroscopic properties the plastic substrate has and enhance reliability of electrical properties of the liquid crystal display device. The barrier film is not particularly limited as long as it has a high degree of transparency and a low degree of water vapor permeability. Generally, a thin film that is formed of an inorganic material such as silicon oxide by means of vapor deposition, sputtering, or a Chemical Vapor Deposition process (CVD process) is used.

In the present invention, as the substrate a or the substrate b, the same material or different materials may be used, and there is no particular limitation. It is preferable to use a glass substrate since a liquid crystal display device excellent in heat resistance or dimensional stability can be prepared. Moreover, it is preferable to use a plastic substrate since this substrate is suitable for a production method implemented by a roll-to-roll method and suitable for becoming lightened and flexible. Furthermore, if it is desired to impart flatness and heat resistance to the substrate, an excellent result can be obtained by combining a plastic substrate with a glass substrate.

In the examples which will be describe later, as a material of the substrate a 100 or b 200, a substrate is used.

In the back plane, the TFT layer 102 and the pixel electrode 103 are disposed on the substrate a 100. These are produced in a general array process. On these constituents, the passivation layer 104 and the alignment layer a 105 are disposed to obtain the back plane.

The passivation layer 104 (also called an "inorganic protective layer") is a layer for protecting the TFT layer, and is generally formed of a nitride film (SiNx), an oxide film (SiOx), or the like by means of the Chemical Vapor Deposition (CVD) technique or the like.

The alignment layer a 105 is a layer that functions to align liquid crystals and uses a polymer material such as polyimide in many cases. As a coating liquid, an aligning agent solution containing a polymer material and a solvent is used. Since the adhesive force between the alignment layer and the sealant is likely to be weakened due to the alignment layer, pattern-wise coating is performed within the sealed area. For the coating, a printing method such as flexography or a liquid droplet ejection method such as ink jet is used. The coated aligning agent solution is temporarily dried to evaporate the solvent and then crosslinked and cured by means of baking. Thereafter, in order to obtain aligning function, alignment treatment is performed.

For the alignment treatment, a rubbing method is generally used. If the polymer film formed as described above is rubbed in one direction with a rubbing cloth formed of fiber such as rayon, a liquid crystal-aligning ability is obtained.

Moreover, sometimes a photoalignment method is used. The photoalignment method is a method of producing the aligning ability by emitting polarized light onto an alignment layer including an organic material having photosensitivity. Unlike the rubbing method, this method does not cause scratches or dust on the substrate. Examples of the organic material in the photoalignment method include materials containing dichroic dyes. As the dichroic dyes, it is possible to use dyes containing groups (hereinafter, simply called "photoalinable groups") that induce alignment of molecules by a Weigert effect resulting from photodichroism or cause a photoreaction as the base of the liquid crystal aligning ability, such as an isomerization reaction (example: an azobenzene group), a dimerization reaction (example: a cinnamoyl group), a photo-crosslinking reaction (example: a benzophenone group), or a photolysis reaction (example: a polyimide group). The coated aligning agent solution is temporarily dried to evaporate the solvent and then irradiated with light (polarized light) polarized in any direction, whereby an alignment layer having aligning ability in any direction can be obtained.

In the front plane at the other side, the black matrix 202, the color filter 203, the planarizing layer 201, the transparent electrode 204, and the alignment layer b 205 are disposed on the substrate b 200.

The black matrix 202 is prepared by, for example, a pigment dispersion method. Specifically, a color resin liquid, in which a black colorant for forming a black matrix has evenly dispersed, is coated onto the substrate b 200 provided with a barrier film 201, thereby forming a colored layer. Subsequently, the colored layer is cured by baking. A photoresist is coated onto this layer, and the resultant is pre-baked. The photoresist is exposed to light through a mask pattern, followed by developing, thereby performing patterning on the colored layer. Thereafter, the photoresist layer is peeled off, and the colored layer is baked to complete the black matrix 202.

Alternatively, a photoresist-type pigment dispersion may be used. In this case, the photoresist-type pigment dispersion is coated, and the resultant is pre-baked and then exposed to light through a mask pattern, followed by developing, thereby performing patterning on the colored layer. Subsequently, the photoresist layer is peeled off, and the colored layer is baked to complete the black matrix 202.

The color filter 203 is prepared by a pigment dispersion method, an electrodeposition method, a printing method, a staining method, or the like. For example, in the pigment dispersion method, a color resin liquid in which a pigment (for example, a red pigment) has evenly dispersed is coated onto the substrate b 200, the resultant is cured by baking, and then a photoresist is coated onto the resultant, followed by pre-baking. After the photoresist is exposed to light through a mask pattern, the resultant is subjected to developing and patterning. Subsequently, the photoresist layer is peeled off, and baking is performed again to complete a (red) color filter 203. The order of colors to be prepared is not particularly limited. In the same manner as described above, a green color filter 203 and a blue color filter 203 are formed.

The transparent electrode 204 is disposed on the color filter 203 (if necessary, for planarizing the surface, the overcoat layer (201) is disposed on the color filter 203). It is preferable for the transparent electrode 204 to have a high transmittance and a small electric resistance. The transparent electrode 204 is formed of an oxide film such as ITO by means of a sputtering method or the like.

For the purpose of protecting the transparent electrode 204, sometimes a passivation layer is disposed on the transparent electrode 204.

The alignment layer b 205 is the same as the aforementioned alignment layer a 105.

So far, specific embodiments of the back plane and front plane used in the present invention have been described. However, the present application is not limited to the specific embodiments, and the embodiments may be freely modified according to the desired liquid crystal display device.

The shape of the columnar spacer described above is not particularly limited, and the horizontal cross-section may have various shapes such as a circular shape or a polygonal shape such as a rectangular shape. However, in consideration of the margin of misalignment at the time of the process, it is particularly preferable for the horizontal cross-section to have a circular shape or a regular polygonal shape.

Moreover, it is preferable for the projection to have the shape of a truncated cone or the shape of a prismoid.

The material of the columnar spacer is not particularly limited as long as it is a sealant, an organic solvent used for a sealant, or a material insoluble in a liquid crystal. However, in view of processability and weight lightening, it is preferable for the material to be a synthetic resin (curable resin). Meanwhile, the projection can be disposed on the surface of a first substrate that comes into contact with the sealant, by a method implemented by photolithography or a liquid droplet ejection method. For this reason, it is preferable to use a photocurable resin which is suitable for the method implemented by photolithography or the liquid droplet ejection method.

For example, a case where the columnar spacer is obtained by the photolithography method will be described.

A resin liquid (not containing a colorant) for forming a columnar spacer is coated onto the transparent electrode 204 of the front plane. Thereafter, the resin layer is cured by baking. A photoresist is coated onto this layer, and the resultant is pre-baked. The photoresist is exposed to light through a mask pattern, followed by developing, and patterning is performed on the resin layer. Subsequently, the photoresist layer is peeled off, and the resin layer is baked to complete a columnar spacer.

The position for forming the columnar spacer can be determined as desired depending on the mask pattern. Accordingly, both the portion inside the sealed area and the portion outside the sealed area (portion coated with a sealant) of the liquid crystal display device can be simultaneously prepared. Moreover, it is preferable for the columnar spacer to be formed in a position on the black matrix such that the quality of the sealed area does not deteriorate. Such columnar spacer prepared by the photolithography method is sometimes called a column spacer or a photo-spacer.

As the material of the spacer, negative water-soluble resins such as a PVA-stilbazo photosensitive resin or a mixture of a polyfunctional acrylic monomer, an acrylic acid copolymer, a triazole-based initiator, and the like are used. Alternatively, there is also a method using a color resin obtained by dispersing a colorant in a polyimide resin. In the present invention, it is possible to obtain a spacer by using known materials according to the compatibility between liquid crystals and a sealant to be used, without particular limitation.

In this manner, the columnar spacer is disposed on the surface which will become a sealed area on the front plane, and then a sealant (301 in FIG. 1) is coated onto the surface of the back plane that is supposed to come into contact with the sealant.

The material of the sealant is not particularly limited, and curable resin compositions obtained by adding a polymerization initiator to epoxy based- or acrylic photocurable resins, thermosetting resins, or resins curable by both the light and heat are used. Moreover, in order to control moisture permeability, elastic modulus, viscosity, and the like, sometimes fillers formed of inorganic or organic substances are added. The shape of the fillers is not particularly limited, and the shape may be spherical, fibrous, amorphous, and the like. In addition, in order to excellently control the cell gap, it is preferable to mix gap materials which have the shape of a sphere with monodisperse size or a fibrous shape. Alternatively, in order to further enhance the adhesion force with respect to the substrate, fibrous substances that are easily entangled with the projection on the substrate may be mixed. The diameter of the fibrous substance used at this time is desirably from about $1/5$ to about equal to or smaller than $1/10$ of the cell gap, and the length of the fibrous material is desirably smaller than the width of the coated seal.

The material of the fibrous substance is not particularly limited as long as a desired shape is obtained. It is possible to appropriately select synthetic fiber such as cellulose, polyamide, and polyester or inorganic materials such as glass, and carbon.

As methods of coating the sealant, there are a printing method and dispensing method. Among these, the dispensing method using a small amount of the sealant is desirable. The sealant is generally coated onto the black matrix such that the sealed area is not negatively affected. In order to form an area for liquid crystal dropping which is the next process (in order to prevent leakage of liquid crystals), the sealant is coated in the form of a closed loop.

Liquid crystals are dropped into the shape of a closed loop (sealed area) of the front plane having been coated with the sealant. Generally, a dispenser is used at this time. Basically, the amount of the liquid crystals dropped is the same amount as the volume obtained by multiplying the height of the columnar spacer by the seal coating area, such that the amount matches with the volume of the liquid crystal cells. However, in order to optimize display properties or liquid crystal leakage caused during the process of sticking cells together, the amount of liquid crystals dropped is appropriately adjusted in some cases, or sometimes the liquid crystals are dropped in dispersed positions.

Thereafter, the front plane, which has been coated with the sealant and has undergone dropping of liquid crystals, is stuck to the back plane. Specifically, the front and back planes are adsorbed onto a stage including a mechanism such as an electrostatic chuck onto which a substrate is adsorbed, and the front and back planes are positioned (keep distance from each other) such that the alignment layer b of the front plane faces the alignment layer a of the back plane, and the sealant does not come into contact with the substrate at the other side. In this state, the internal pressure of the system is reduced. After pressure reduction ends, the positions of both the substrates are adjusted while the sticking position of the front plane and the back plane is being checked (alignment operation). After the adjustment of the sticking position ends, the substrates are caused to be close to each other such that they are placed in a position where the sealant on the front plane comes into contact with the back plane. In this state, inert gas is filled in the system, and the pressure reduction state is slowly released to return the pressure to a normal pressure. At this time, due to the atmospheric pressure, the front plane is stuck to the back plane, and a cell gap whose length is the same as the height of the columnar spacer is formed. In this state, the sealant is cured by being irradiated with UV rays, thereby forming liquid crystal cells. Thereafter, in some cases, a heating process is additionally performed to accelerate curing of the sealant. In many cases, in order to enhance the adhesion force of the sealant or to improve reliability of electrical properties, the heating process is additionally performed.

EXAMPLES

Hereinafter, the present invention will be described in more detail based on examples, but the present invention is not limited to these examples. Moreover, in the compositions of the following examples and comparative examples, "%" means "% by mass".

In examples, the following properties were measured.

Tni: nematic phase-isotropic liquid phase transition temperature (° C.)

$\Delta n$: refractive index anisotropy at 300K $\Delta \in$: dielectric anisotropy at 300K η: viscosity at 295K (mPa·s)

γ1: rotational viscosity at 300K (mPa·s)

VHR: voltage-holding ratio (%) at 325K under conditions of a frequency of 60 Hz and an applied voltage of 4 V Ghosting:

For evaluating ghosting of a liquid crystal display device, a predetermined fixed pattern is displayed for 1,200 hours in a display area. Thereafter, uniform display is performed on the entire screen, and ghost images of the fixed pattern that are shown at this time are visually observed and evaluated to be four levels as below.

A: No ghost image

B: There is a little bit of ghost image, but it is at an acceptable level.

C: There are ghost images, and it is at an unacceptable level.

D: There are ghost images, and display quality is very poor.

Dropping Marks:

For evaluating dropping marks of a liquid crystal display device, dropping marks that look white and are floating on the screen when black display is performed on the entire screen display black are visually observed and evaluated to be four levels as below.

A: No ghost image

B: There is a little bit of ghost image, but it is at an acceptable level.

C: There are ghost images, and it is at an unacceptable level.

D: There are ghost images, and display quality is very poor.

Process Suitability:

For evaluating process suitability, liquid crystals were dropped by 80 pL at a time by using a constant-pump metering pump by an ODF process. This operation was performed 100,000 times, and the change in the amount of liquid crystals dropped for every 100 operations such as "0 to $100^{th}$ operations, the $101^{st}$ to $200^{th}$ operations, the $201^{st}$ to $300^{th}$ operations, . . . , and the $99,901^{st}$ to $100,000^{th}$ operations" was evaluated to be four levels as below.

A: The amount changes in an extremely small degree (liquid crystal display device can be stably produced).

B: The amount changes slightly, but it is at an acceptable level.

C: The amount changes, and this is an unacceptable level (yield deteriorates due to formation of spots).

D: The amount changes, and the process suitability is extremely poor (liquid crystals leak or vacuum bubbles are formed).

Solubility at a Low Temperature:

For evaluating solubility at a low temperature, a liquid crystal composition was prepared, and 1 g of the liquid crystal composition was weighed and put into a 3 mL sample vial. The temperature of the sample was continuously changed by one cycle consisting of "−20° C. (held for 1 hour)→increasing temperature (0.1° C./min)→0° C. (held for 1 hour)→increasing temperature (0.1° C./min)→20° C. (held for 1 hour)→decreasing temperature (−0.1° C./min)→0° C. (held for 1 hour)→decreasing temperature (−0.1° C./min)→−20° C." in a temperature controlled test chamber. Whether a precipitate was generated from the liquid crystal composition was visually observed, and evaluation was performed in the following four levels.

A: A precipitate is not observed for a time equal to or longer than 500 hours.

B: A precipitate is not observed for a time equal to or longer than 250 hours.

C: A precipitate is observed within 100 hours.

D: A precipitate is observed within 50 hours.

Moreover, the compounds in the examples are described using the following abbreviation.

(Ring Structure)

[Chem. 123]

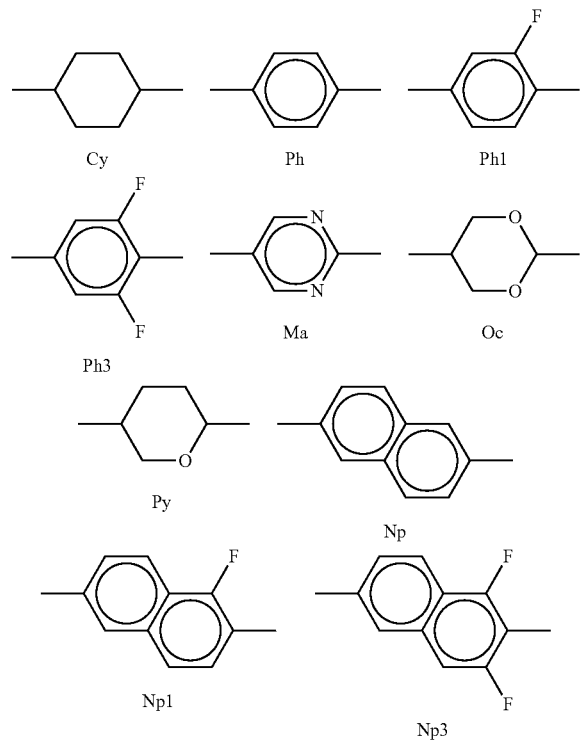

[Side Chain Structure and Linkage Structure]

TABLE 1

| | |
|---|---|
| n (number) of terminal | $C_nH_{2n+1}$— |
| —ndoFF | —$(CH_2)_{n-1}$—HC=CFF |
| -2- | —$CH_2CH_2$— |
| —1O— | —$CH_2O$— |
| —O1— | —$OCH_2$— |
| —V— | —CO— |
| —VO— | —COO— |
| —CFFO— | —$CF_2O$— |
| —F | —F |
| —Cl | —Cl |
| —OCFFF | —$OCF_3$ |
| —CFFF | —$CF_3$ |
| —On | —$OC_nH_{2n+1}$ |
| ndm- | $C_nH_{2n+1}$—HC=CH—$(CH_2)_{m-1}$— |
| —ndmO— | —$(CH_2)_{n-1}$—HC=CH—$(CH_2)_{m-1}O$— |
| —Ondm | —O—$(CH_2)_{n-1}$—HC=CH—$CmH_{2m+1}$ |
| -ndm- | —$(CH_2)_{n-1}$—HC=CH—$(CH_2)_{m-1}$— |
| —CN | —C≡N |
| —T— | —C≡C— |

Example 1 and Comparative Example 1

A liquid crystal composition of Example 1 that contained both the compound represented by Formula (1.1) and the compound represented by Formula (2.1) was prepared. Moreover, a liquid crystal composition of Comparative example 1 that contained not the compound represented by Formula (1.1) but the compound represented by Formula (2.1) was prepared.

TABLE 2

| Chemical structure | Ratio (%) Comparative example 1 | Ratio (%) Example 1 |
|---|---|---|
| 0d1-Cy—Cy—Ph-1 | 18 | 18 |
| 3-Ph—Ph3—CFFO—Ph3—F | 14.5 | 14.5 |
| 3-Cy—Cy-1d0 | 40 | 40 |
| 2-Ph—Ph1—Ph-3 | 5 | 5 |
| 2-Ph—Ph1—Ph-4 | 5 | 5 |
| 1-Ph—Ph-3d1 | 7.5 | 7.5 |
| 3-Cy—Ph—Ph—Cy-3 | 3 | 3 |
| 3-Ph—Ph1—Ph1—CFFO—Ph3—F | 7 | |
| 3-Py—Ph—Ph3—CFFO—Ph3—F | | 7 |
| Transition point | 75.5 | 74.7 |
| Birefringence | 0.1165 | 0.1136 |
| Dielectric anisotropy | 4.90 | 5.02 |
| Rotational viscosity | 57 | 56 |
| Initial VHR | 99.5 | 99.5 |
| VHR measured after 1 hour at 150° C. | 98.5 | 98.4 |
| Evaluation of ghosting | B | B |
| Evaluation of dropping marks | B | B |
| Process suitability | C | B |
| Evaluation of solubility at low temperature | D | B |

Example 1 exhibited better performances in the evaluation of dropping marks, process suitability and solubility at a low temperature, compared to Comparative example 1.

Example 2 and Comparative Example 2

A liquid crystal composition of Example 2 that contained both the compound represented by Formula (1.1) and the compound represented by Formula (2.1) was prepared. Moreover, a liquid crystal composition of Comparative example 2 that contained not the compound represented by Formula (2.1) but the compound represented by Formula (1.1) was prepared.

TABLE 3

| Chemical structure | Ratio (%) Comparative example 2 | Ratio (%) Example 2 |
|---|---|---|
| 3-Cy—Cy-1d0 | 50 | 50 |
| 3-Cy—Cy-1d1 | 10 | 10 |
| 2-Ph—Ph1—Ph-3 | 8 | |
| 2-Ph—Ph1—Ph-4 | 8 | |
| 3-Cy—Ph—Ph-2 | 4 | 4 |
| 0d1-Cy—Cy—Ph-1 | | 8 |
| 0d3-Cy—Cy—Ph-1 | | 8 |
| 2-Py—Ph—Ph3—CFFO—Ph3—F | 10 | 10 |
| 3-Py—Ph—Ph3—CFFO—Ph3—F | 10 | 10 |
| Transition point | 74.5 | 75.7 |
| Birefringence | 0.1052 | 0.0801 |
| Dielectric anisotropy | 5.50 | 5.48 |
| Rotational viscosity | 52 | 49 |
| Initial VHR (%) | 99.5 | 99.5 |
| VHR (%) measured after 1 hour at 150° C. | 98.5 | 98.4 |
| Evaluation of ghosting | B | B |
| Evaluation of dropping marks | B | B |
| Process suitability | D | A |
| Evaluation of solubility at low temperature | D | B |

Example 2 exhibited better performances in the evaluation of process suitability and solubility at a low temperature, compared to Comparative example 2. Particularly, Example 2 exhibited extremely excellent performance in the evaluation of process suitability.

Example 3 and Comparative Example 3

A liquid crystal composition of Example 3 that contained both the compound represented by Formula (1.1) and the compound represented by Formula (2.1) was prepared. Moreover, a liquid crystal composition of Comparative example 3 that contained not the compound represented by Formula (1.1) but the compound represented by Formula (2.1) was prepared.

TABLE 4

| Chemical structure | Ratio (%) Example 3 | Ratio (%) Comparative example 3 |
|---|---|---|
| 3-Cy—Ph—O1 | 11 | 11 |
| 4-Cy—Cy-1d0 | 11 | 11 |
| 5-Cy—Cy-1d0 | 10 | 10 |
| 3-Cy—Cy-1d1 | 8 | 8 |
| 0d1-Cy—Cy—Ph-1 | 17 | 17 |
| 3-Cy—Cy—Ph—OCFFF | 3 | 3 |
| 3-Ph—Ph3—CFFO—Ph3—F | 9 | 9 |
| 0d3-Cy—Cy—Ph-1 | 9 | 9 |
| 3-Cy—Cy—Ph1—Ph3—F | 7 | 7 |
| 3-Ph—Ph1—Ph3—CFFO—Ph3—F | 5 | 5 |
| 3-Cy—Cy-4 | 4 | 4 |
| 0d3-Ph—Ph1—Ph-2 | 1 | 1 |
| 3-Py—Ph—Ph3—CFFO—Ph3—F | 4 | |
| 3-Ph—Ph—Ph1—Ph3—F | 1 | 1 |
| 4-Py—Ph—Ph3—CFFO—Ph3—F | | 4 |
| Transition point | 89.9 | 89.9 |
| Birefringence | 0.1050 | 0.1046 |
| Dielectric anisotropy | 6.73 | 6.68 |
| Rotational viscosity | 70 | 70 |
| Initial VHR (%) | 99.5 | 99.5 |
| VHR (%) measured after 1 hour at 150° C. | 98.5 | 98.4 |
| Evaluation of ghosting | A | B |
| Evaluation of dropping marks | A | C |
| Process suitability | A | D |
| Evaluation of solubility at low temperature | A | C |

Example 3 exhibited better performance in the evaluation of ghosting, dropping marks, process suitability, and solubility at a low temperature, compared to Comparative example 3.

Examples 4 to 6

Liquid crystal compositions of Example 4 to 6 that contained both the compound represented by Formula (1.1) and the compound represented by Formula (2.1) were prepared.

TABLE 5

| Chemical structure | Ratio (%) Example 4 | Example 5 | Example 6 |
|---|---|---|---|
| 3-Cy—Cy-4 | 4 | 4 | 7 |
| 3-Cy—Ph—O1 | 9 | 8 | 7 |
| 4-Cy—Cy-1d0 | 9 | 8 | 17 |
| 5-Cy—Cy-1d0 | 8 | 7 | 5 |
| 3-Cy—Cy-1d1 | 12 | 14 | 5 |
| 0d1-Cy—Cy—Ph-1 | 15 | 13 | 19 |
| 0d3-Cy—Cy—Ph-1 | 9 | 11 | 5 |
| 0d3-Ph—Ph1—Ph-2 | 3 | 5 | 5 |
| 3-Py—Ph—Ph3—CFFO—Ph3—F | 5 | 6 | 7 |
| 3-Ph—Ph3—CFFO—Ph3—F | 8 | 8 | 7 |
| 3-Ph—Ph1—Ph3—CFFO—Ph3—F | 7 | 6 | 5 |
| 3-Cy—Cy—Ph—OCFFF | 3 | 4 | 5 |
| 3-Ph—Ph—Ph1—Ph3—F | 3 | 2 | 2 |
| 3-Cy—Cy—Ph1—Ph3—F | 5 | 4 | 4 |

TABLE 5-continued

| Chemical structure | Ratio (%) Example 4 | Example 5 | Example 6 |
|---|---|---|---|
| $T_{NI}$/° C. | 92.0 | 94.2 | 91.9 |
| $\Delta n$ | 0.113 | 0.115 | 0.111 |
| $\Delta\epsilon$ | 7.64 | 7.38 | 6.94 |
| $\eta$/mPa · s | 16.8 | 17.1 | 16.8 |
| $Y_1$/mPa · s | 84 | 81 | 77 |
| Initial VHR (%) | 99.5 | 99.3 | 99.2 |
| VHR (%) measured after 1 hour at 150° C. | 98.5 | 98.2 | 98.0 |
| Evaluation of ghosting | A | A | A |
| Evaluation of dropping marks | B | A | A |
| Process suitability | | | |
| Evaluation of solubility at low temperature | A | A | B |
| | A | B | A |

Example 4 exhibited extremely excellent performances in the evaluation of ghosting, process suitability, and solubility at a low temperature. Example 5 exhibited extremely excellent performances in the evaluation of ghosting, dropping marks, and process suitability. Example 6 exhibited extremely excellent performances in the evaluation of ghosting, dropping marks, and solubility at a low temperature.

Examples 7 to 10

Liquid crystal compositions of Example 7 to 10 that contained both the compound represented by Formula (1.1) and the compound represented by Formula (2.1) were prepared.

TABLE 6

| Chemical structure | Ratio (%) Example 7 | Example 8 | Example 9 | Example 10 |
|---|---|---|---|---|
| 4-Cy—Cy-1d0 | 22 | 20 | 19 | 18 |
| 5-Cy—Cy-1d0 | 6 | 9 | 11 | 11 |
| 0d1-Cy—Cy—Ph-1 | 8 | 7 | 9 | 10 |
| 3-Cy—Cy—VO—Ph—Cy-3 | 3 | 3 | 2 | 2 |
| 3-Ph—Ph3—CFFO—Ph3—F | 15 | 14 | 13 | 12 |
| 3-Cy—Cy—CFFO—Ph3—F | 7 | 8 | 9 | 11 |
| 5-Cy—Cy—CFFO—Ph3—F | 8 | 8 | 7 | 7 |
| 2-Py—Ph—Ph3—CFFO—Ph3—F | 8 | 11 | 12 | 14 |
| 3-Py—Ph—Ph3—CFFO—Ph3—F | 7 | 5 | 4 | 2 |
| 3-Ph—Ph1—Ph3—CFFO—Ph3—F | 7 | 6 | 5 | 4 |
| 3-Cy—Cy—Ph1—Ph3—F | 2 | 3 | 4 | 5 |
| 3-Cy—Ph—Ph3—Ph1—OCFFF | 6 | 5 | 3 | 1 |
| 3-Ph—Ph—Ph1—Ph3—F | 1 | 1 | 2 | 3 |
| $T_{NI}$/° C. | 94.8 | 97.5 | 96.7 | 100.1 |
| $\Delta n$ | 0.121 | 0.120 | 0.118 | 0.117 |
| $\Delta\epsilon$ | 17.12 | 16.80 | 15.44 | 14.80 |
| $\eta$/mPa · s | 35.0 | 34.4 | 31.2 | 30.0 |
| $Y_1$/mPa · s | 190 | 198 | 190 | 189 |
| Initial VHR (%) | 99.5 | 99.5 | 99.5 | 99.5 |
| VHR (%) measured after 1 hour at 150° C. | 98.5 | 98.4 | 98.5 | 98.4 |
| Evaluation of ghosting | A | A | A | B |
| Evaluation of dropping marks | A | B | B | A |
| Process suitability | | | | |
| Evaluation of solubility at low temperature | A | A | A | A |
| | A | A | A | A |

Example 7 exhibited extremely excellent performances in the evaluation of ghosting, dropping marks, process suitability, and solubility at a low temperature. Example 8 exhibited extremely excellent performances in the evaluation of ghosting, process suitability, and the solubility at a low temperature. Example 9 exhibited extremely excellent performances in the evaluation of ghosting, process suitability, and solubility at a low temperature. Example 10 exhibited extremely excellent performances in the evaluation of dropping marks, process suitability, and solubility at a low temperature.

Examples 11 to 14

Liquid crystal compositions of Examples 11 to 14 that contained the compound represented by Formula (1.1) and the compound represented by Formula (2.1) were prepared.

TABLE 7

| Chemical structure | Ratio (%) | | | |
|---|---|---|---|---|
| | Example 11 | Example 12 | Example 13 | Example 14 |
| 3-Cy—Cy-1d1 | 9 | 10 | 7 | 7 |
| 3-Cy—Cy-1d0 | 28 | 27 | 29 | 25 |
| 0d1-Cy—Cy—Ph-1 | 16 | 21 | 22 | 18 |
| 0d3-Cy—Cy—Ph-1 | 15 | 11 | 10 | 16 |
| 2-Ph—Ph3—CFFO—Ph3—F | 2 | 1 | 4 | |
| 3-Ph—Ph3—CFFO—Ph3—F | 12 | 13 | 14 | 10 |
| 3-Cy—Cy—CFFO—Ph3—F | 7 | 6 | 7 | 5 |
| 3-Py—Ph—Ph3—CFFO—Ph3—F | 6 | 5 | 4 | 8 |
| 2-Py—Ph—Ph3—CFFO—Ph3—F | 3 | 2 | 2 | 4 |
| 3-Ph—Ph1—Ph3—CFFO—Ph3—F | 3 | 4 | 5 | 3 |
| $T_{NI}/°$ C. | 90.0 | 89.8 | 89.1 | 93.4 |
| $\Delta n$ | 0.105 | 0.105 | 0.104 | 0.110 |
| $\Delta \epsilon$ | 7.00 | 6.47 | 6.66 | 7.68 |
| $\eta$/mPa·s | 17.0 | 16.4 | 16.6 | 20.4 |
| $Y_1$/mPa·s | 60 | 58 | 57 | 74 |
| Initial VHR (%) | 99.5 | 99.9 | 99.2 | 99.4 |
| VHR (%) measured after 1 hour at 150° C. | 98.5 | 98.4 | 98.5 | 98.4 |
| Evaluation of ghosting | A | A | A | A |
| Evaluation of dropping marks | A | A | A | A |
| Process suitability | A | B | A | A |
| Evaluation of solubility at low temperature | A | A | B | B |

Example 11 exhibited extremely excellent performances in the evaluation of ghosting, dropping marks, process suitability, and solubility at a low temperature. Example 12 exhibited extremely excellent performances in the evaluation of ghosting, dropping marks, and solubility at a low temperature. Example 13 exhibited extremely excellent performances in the evaluation of ghosting, dropping marks, and process suitability. Example 14 exhibited extremely excellent performances in the evaluation of ghosting, dropping marks, and process suitability.

Examples 15 to 18

Liquid crystal composition of Examples 15 to 18 that contained both the compound represented by Formula (1.1) and the compound represented by Formula (2.1) were prepared.

TABLE 8

| Chemical structure | Ratio (%) | | | |
|---|---|---|---|---|
| | Example 15 | Example 16 | Example 17 | Example 18 |
| 2-Py—Ph—Ph3—CFFO—Ph3—F | 4 | 3 | 4 | 3 |
| 3-Py—Ph—Ph3—CFFO—Ph3—F | 4 | 3 | 4 | 5 |
| 3-Ph—Ph1—Ph3—CFFO—Ph3—F | 4 | 5 | 4 | 5 |
| 3-Cy—Cy—CFFO—Ph3—F | 2 | 3 | 2 | 1 |
| 3-Ph—Ph3—CFFO—Ph3—F | 8 | 6 | 8 | 9 |
| 3-Cy—Cy—Ph1—Ph3—F | 5 | 6 | 5 | 6 |
| 3-Cy—Ph—Ph3—Ph1—OCFFF | 6 | 7 | 6 | 8 |
| 3-Cy—Cy—Ph—OCFFF | 6 | 7 | 6 | 5 |
| 3-Cy—Cy-1d1 | 17 | 19 | 10 | 15 |
| 3-Cy—Cy-1d0 | 39 | 37 | 46 | 40 |
| 0d1-Cy—Cy—Ph-1 | 5 | 4 | 5 | 3 |
| $T_{NI}/°$ C. | 85.3 | 87.4 | 82.8 | 82.5 |
| $\Delta n$ | 0.099 | 0.097 | 0.097 | 0.102 |
| $\Delta \epsilon$ | 8.48 | 7.99 | 8.62 | 9.57 |
| $\eta$/mPa·s | 17.0 | 16.4 | 16.4 | 18.3 |
| $Y_1$/mPa·s | 83 | 81 | 78 | 86 |
| Initial VHR (%) | 99.5 | 99.5 | 99.5 | 99.5 |
| VHR (%) measured after 1 hour at 150° C. | 98.5 | 98.4 | 98.5 | 98.4 |
| Evaluation of ghosting | A | B | A | A |
| Evaluation of dropping marks | A | A | B | A |
| Process suitability | A | A | A | B |
| Evaluation of solubility at low temperature | A | A | B | B |

Example 15 exhibited extremely excellent performances in the evaluation of ghosting, dropping marks, process suitability, and solubility at a low temperature. Example 16 exhibited extremely excellent performances in the evaluation of process suitability, dropping marks, and solubility at a low temperature. Example 17 exhibited extremely excellent performances in the evaluation of ghosting, solubility at a low temperature, and process suitability. Example 18 exhibited extremely excellent performances in the evaluation of ghosting and dropping marks.

Examples 19 to 22

Liquid crystal compositions of Examples 19 to 22 that contained both the compound represented by Formula (1.1) and the compound represented by Formula (2.1) were prepared.

TABLE 9

| Chemical structure | Ratio (%) | | | |
| --- | --- | --- | --- | --- |
|  | Example 19 | Example 20 | Example 21 | Example 22 |
| 3-Ph—Ph1—Ph3—CFFO—Ph3—F3 | 7 | 6 | 6 |  |
| 4-Ph—Ph1—Ph3—CFFO—Ph3—F | 7 | 3 | 4 | 6 |
| 5-Ph—Ph1—Ph3—CFFO—Ph3—F | 3 | 3 | 2 |  |
| 3-Ph—Ph3—CFFO—Ph3—F | 2 | 3 | 4 | 6 |
| 3-Cy—Cy—CFFO—Ph3—F | 3 | 2 | 1 |  |
| 2-Py—Ph—Ph3—CFFO—Ph3—F | 5 | 2 | 1 |  |
| 3-Py—Ph—Ph3—CFFO—Ph3—F | 7 | 10 | 11 | 12 |
| 3-Cy—Cy—Ph—OCFFF | 6 | 5 | 4 | 9 |
| 5-Cy—Cy—Ph—OCFFF | 3 | 4 | 5 |  |
| 3-Cy—Cy-1d1 | 14 | 17 | 19 | 13 |
| 3-Cy—Cy-1d0 | 37 | 34 | 33 | 39 |
| 0d1-Cy—Cy—Ph-1 | 7 | 8 | 9 | 9 |
| 0d3-Cy—Cy—Ph-1 | 3 | 2 | 1 |  |
| $T_{NI}/°$ C. | 92.8 | 91.2 | 89.0 | 91.2 |
| $\Delta n$ | 0.109 | 0.109 | 0.108 | 0.113 |
| $\Delta \epsilon$ | 11.95 | 11.85 | 11.17 | 13.76 |
| $\eta$/mPa · s | 19.0 | 18.2 | 16.7 | 21.6 |
| $Y_1$/mPa · s | 96 | 94 | 86 | 90 |
| Initial VHR (%) | 99.5 | 99.6 | 99.5 | 99.3 |
| VHR (%) measured after 1 hour at 150° C. | 98.5 | 98.4 | 98.5 | 98.4 |
| Evaluation of ghosting | A | B | A | A |
| Evaluation of dropping marks | A | A | A | B |
| Process suitability |  |  |  |  |
| Evaluation of solubility at low temperature | A | A | B | B |
|  | A | A | A | A |

Example 19 exhibited extremely excellent performances in the evaluation of ghosting, dropping marks, process suitability, and solubility at a low temperature. Example 20 exhibited extremely excellent performances in the evaluation of process suitability, dropping marks, and solubility at a low temperature. Example 21 exhibited extremely excellent performances in the evaluation of ghosting, solubility at a low temperature, and dropping marks. Example 22 exhibited extremely excellent performances in the evaluation of ghosting and solubility at a low temperature.

Examples 23 to 26

Liquid crystal compositions of Examples 23 to 26 that contained both the compound represented by Formula (1.1) and the compound represented by Formula (2.1) were prepared.

TABLE 10

| Chemical structure | Ratio (%) | | | |
| --- | --- | --- | --- | --- |
|  | Example 23 | Example 24 | Example 25 | Example 26 |
| 4-Cy—Cy-1d0 | 17 | 18 | 16 | 20 |
| 3-Cy—Cy-1d1 | 8 | 9 | 10 | 6 |
| 0d1-Cy—Cy—Ph-1 | 14 | 15 | 17 | 11 |
| 0d3-Cy—Cy—Ph-1 | 13 | 10 | 9 | 15 |
| 1-Ph—Ph-3d0 | 5 | 4 | 4 | 3 |
| 5-Cy—Ph—Ph1—Ph-2 | 3 | 3 | 4 | 2 |
| 5-Cy—Ph—Ph1—Ph-3 | 3 | 4 | 4 | 6 |
| 3-Cy—Ph—Cl | 8 | 8 | 8 | 8 |

TABLE 10-continued

| | Ratio (%) | | | |
|---|---|---|---|---|
| Chemical structure | Example 23 | Example 24 | Example 25 | Example 26 |
| 3-Ph—Ph3—CFFO—Ph3—F | 14 | 15 | 13 | 13 |
| 3-Ph—Ph1—Ph3—CFFO—Ph3—F | 4 | 4 | 5 | 3 |
| 2-Py—Ph—Ph3—CFFO—Ph3—F | 4 | 3 | 2 | 2 |
| 3-Py—Ph—Ph3—CFFO—Ph3—F | 6 | 6 | 7 | 8 |
| 3-Cy—Cy—Ph1—Ph3—F | 2 | 1 | 1 | 3 |
| $T_{NI}/°$ C. | 102.8 | 100.0 | 105.3 | 109.1 |
| $\Delta n$ | 0.121 | 0.119 | 0.121 | 0.119 |
| $\Delta\epsilon$ | 9.41 | 9.66 | 9.20 | 9.54 |
| $\eta$/mPa · s | 16.6 | 16.4 | 17.0 | 17.4 |
| $Y_1$/mPa · s | 82 | 77 | 85 | 86 |
| Initial VHR (%) | 99.5 | 99.1 | 99.5 | 99.4 |
| VHR (%) measured after 1 hour at 150° C. | 98.5 | 98.1 | 98.5 | 98.5 |
| Evaluation of ghosting | A | B | A | A |
| Evaluation of dropping marks | A | A | A | B |
| Process suitability | A | A | B | B |
| Evaluation of solubility at low temperature | A | B | B | A |

Example 23 exhibited extremely excellent performances in the evaluation of ghosting, dropping marks, process suitability, and solubility at a low temperature. Example 24 exhibited extremely excellent performances in the evaluation of process suitability and dropping marks. Example 25 exhibited extremely excellent performances in the evaluation of ghosting and dropping marks. Example 26 exhibited extremely excellent performances in the evaluation of ghosting and solubility at a low temperature.

Examples 27 to 30

Liquid crystal compositions of Examples 27 to 30 that contained both the compound represented by Formula (1.1) and the compound represented by Formula (2.1) were prepared.

suitability, and solubility at a low temperature. Example 28 exhibited extremely excellent performances in the evaluation of ghosting, dropping marks, process suitability, and solubility at a low temperature. Example 29 exhibited extremely excellent performances in the evaluation of ghosting, dropping marks, process suitability, and solubility at a low temperature. Example 30 exhibited extremely excellent performances in the evaluation of ghosting, dropping marks, process suitability, and solubility at a low temperature.

Example 31

0.3% of a polymerizable compound represented by Formula (V-2) was added to 99.7% of the nematic liquid crystal composition LC-7 described in Example 4 and homoge-

TABLE 11

| | Ratio (%) | | | |
|---|---|---|---|---|
| Chemical structure | Example 27 | Example 28 | Example 29 | Example 30 |
| 0d1-Cy—Cy—Ph-1 | 20 | 22 | 24 | 8 |
| 0d3-Cy—Cy—Ph-1 | 6 | 4 | 2 | 18 |
| 3-Cy—Cy-1d0 | 30 | 26 | 37 | 40 |
| 3-Cy—Cy-1d1 | 4 | | | |
| 3-Py—Ph—Ph3—CFFO—Ph3—F | 5 | 4 | 3 | 2 |
| 3-Cy—Cy—Ph1—Ph3—F | 6 | 4 | 2 | 2 |
| 3-Ph—Ph3—CFFO—Ph3—F | 16 | 18 | 14 | 11 |
| 3-Cy—Cy—CFFO—Ph3—F | 8 | 10 | 12 | 12 |
| 5-Cy—Cy—CFFO—Ph3—F | 9 | 8 | 6 | 7 |
| $T_{NI}/°$ C. | 88.3 | 84.3 | 80.9 | 85.5 |
| $\Delta n$ | 0.095 | 0.095 | 0.086 | 0.082 |
| $\Delta\epsilon$ | 9.00 | 9.03 | 6.82 | 6.25 |
| $\eta$/mPa · s | 15.6 | 15.5 | 10.8 | 9.7 |
| $Y_1$/mPa · s | 75 | 71 | 58 | 58 |
| Initial VHR (%) | 99.5 | 99.5 | 99.5 | 99.5 |
| VHR (%) measured after 1 hour at 150° C. | 98.5 | 98.4 | 98.5 | 98.4 |
| Evaluation of ghosting | A | A | A | A |
| Evaluation of dropping marks | A | A | A | A |
| Process suitability | A | A | A | A |
| Evaluation of solubility at low temperature | A | A | A | A |

Example 27 exhibited extremely excellent performances in the evaluation of ghosting, dropping marks, process neously dissolved in the composition, thereby obtaining a polymerizabe liquid crystal composition CLC-7.

[Chem. 124]

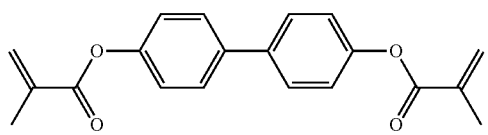

Physical properties of the CLC-7 were almost the same as the physical properties of the nematic liquid crystal composition described in Example 4. The CLC-7 was filled in an ITO-attached cell, which had a cell gap of 3.5 μm and had been coated with a polyimide alignment layer inducing homogeneous alignment, by means of vacuum fill process. While a rectangular wave having a frequency of 1 kHz was being applied to this cell, the liquid crystal cell was irradiated with UV rays from a high-pressure mercury lamp through a filer that cut UV rays of 320 nm or shorter. The irradiation intensity was adjusted such that it became 10 mW/cm2 on the cell surface, and the irradiation was performed for 600 seconds, thereby obtaining a liquid crystal display device with horizontal alignment properties in which the polymerizable compound in the polymerizable liquid crystal composition had been polymerized. It was found that the polymerization of the polymerizable compound generated an anchoring force acting on the liquid crystal compound.

Example 32

Production of Liquid Crystal Display Device for Driving Active Matrix (Preparation of Front Plane)
(Formation of Black Matrix)
A borosilicate glass substrate (OA-10 manufactured by Nippon Electric Glass Co., Ltd.) for liquid crystal display devices was coated with a composition for forming a black matrix composed as below by using a die coater such that the thickness thereof became 10 μm in a wet state. After being dried, the resultant was pre-baked for 2 minutes at a condition of a temperature of 90° C. to form a black matrix layer having a thickness of 2 μn.

(Coating Composition for Forming Black Matrix)

| | |
|---|---|
| Benzyl methacrylate/methacrylic acid copolymer (molar ratio = 73/27) | 300 parts |
| Dipentaerythritol hexaacrylate | 160 parts |
| Carbon black dispersion | 300 parts |
| Photopolymerization initiator (2-benzyl-2-dimethylamino-1-(4-morpholinopheny) butanone-1) | 5 parts |
| Propylene glycol monomethyl ether acetate | 1,200 parts |

*All of the unit "part" is based on a mass.

Subsequently, the glass substrate with the black matrix layer obtained as above was put into an exposure apparatus equipped with a device transporting the substrate from the upstream side to the downstream side, and was transported to an exposure portion.

The temperature of the body of the exposure device was adjusted to 23° C.±0.1° C., and the relative humidity thereof was adjusted to 60%±1% respectively.

The glass substrate with the black matrix layer was adsorbed and fixed onto an exposure stand, and then a gap between the coating film surface of the glass substrate and a photomask pattern was automatically adjusted to 100 μm. Moreover, regarding the exposure position of the glass substrate, a distance from the end surface of the glass substrate was automatically detected, the position was automatically adjusted such that a certain distance was kept between the glass substrate and the position of the photomask pattern, and then the substrate was exposed to light. As a light source, a high-pressure mercury lamp was used. The exposure area was set to 200 mm×200 mm, and this area was irradiated for 20 seconds with I rays (wavelength; 365 nm) at an illuminance of 15 mW/cm2 and an exposure dose of 300 mJ/cm2.

A developing device was installed at the downstream side of the exposure machine to perform developing treatment. The glass substrate having undergone the exposure treatment was transported at a constant speed of 400 mm/min, thereby obtaining a black matrix layer-attached substrate (1) on which a black matrix having a predetermined pattern had been laminated.

The change in dimension of an alignment mark formed of the same material as that of the black matrix was measured in the transport direction and a direction vertical to the transport direction by using a dimension-measuring instrument (NEXIV VMR-6555 manufactured by NIKON METROLOGY, INC.) under conditions of a temperature of 23° C.±0.1° C. and a relative humidity of 60%±1%. As a result, while the dimension of the photomask was measured to be 100.000 mm in the transport direction and 100.000 mm in the vertical direction, the dimension of the pattern practically formed on the glass substrate was measured to be 99.998 mm in the transport direction and 100.001 mm in the vertical direction.

Thereafter, the black matrix was thermally cured by being post-baked for 30 minutes at 220° C. in a baking furnace. The obtained black matrix was measured under the same conditions as described above (a temperature of 23° C.±0.1° C. and a relative humidity of 60%±1%). As a result, the dimension of the pattern formed on the substrate (1) was measured to be 99.998 mm in the transport direction and 100.001 mm in the vertical direction.

(Formation of RGB Colored Layer)

A composition for forming a colored pattern composed as below was coated onto the black matrix layer-attached substrate (1) by using a die coater such that the thickness thereof became 10 μm in a wet state. After being dried, the resultant was pre-baked for 2 minutes at a condition of a temperature of 90° C., thereby obtaining a substrate (1) attached with black matrix layer/composition for forming a colored pattern having a thickness of 2 μm.

Hereinafter, the makeup of the composition for forming a red colored pattern will be described. However, if the red pigment is replaced with any type of green pigment, a composition for forming a GREEN colored pattern is obtained, and if it is replaced with any type of blue pigment, a composition for forming a BLUE colored pattern is obtained. Each of coloring pigments of red, green, and blue contains a resin composition to improve chromogenic properties or luminance in some cases. As the resin composition used for the above purpose, block copolymers with methacrylic acid having primary, secondary, or tertiary amino group are frequently used, and specific examples thereof include "BYK 6919" manufactured by BYK-Chemie GmbH. and the like.

(Composition for Forming Red Colored Pattern)

| | |
|---|---|
| Benzyl methacrylate/methacrylic acid copolymer (molar ratio = 73/27) | 50 parts |
| Trimethylolpropane triacrylate | 40 parts |
| Red pigment (C.I. Pigment Red 254) | 90 parts |
| Photopolymerization initiator (2-methyl-1-[4-(methylthio)phenyl]-2-morpholinopropanone-1) | 1.5 parts |
| Propylene glycol monomethyl ether acetate | 600 parts |

*All of the unit "part" is based on a mass.

(Case of Green Colored Pattern)

A composition for forming a green colored pattern was produced in the same manner as for the composition for forming a red colored pattern, except that a green pigment (for example, C. I. Pigment Green 58) was used instead of a red pigment used in the composition for forming a red colored pattern.

(Case of Blue Colored Pattern)

A composition for forming a blue colored pattern was produced in the same manner as for the composition for forming a red colored pattern, except that a blue pigment (for example, C. I. Pigment Blue 15.6) was used instead of a red pigment used in the composition for forming a red colored pattern.

The black matrix layer/composition for forming a colored pattern-attached substrate (1) obtained as above was put into the exposure apparatus equipped with a transport device extending from the upstream side to the downstream side thereof, and transported to an exposure portion.

The temperature of the body of the exposure apparatus was adjusted to 23° C.±0.1° C. and the relative humidity thereof was adjusted to 60%±1% respectively.

The black matrix layer/composition for forming a colored pattern-attached substrate (1) was adsorbed and fixed onto an exposure stand, and then a gap between the coating film surface of the black matrix layer/composition for forming a colored pattern-attached substrate (1) and a photomask pattern was automatically adjusted to 100 µm. Moreover, regarding the exposure position of the black matrix layer/composition for forming a colored pattern-attached substrate (1), a distance from the end surface of the black matrix layer/composition for forming a colored pattern-attached substrate (1) was automatically detected, the position was automatically adjusted such that a certain distance was kept between the black matrix layer/composition for forming a colored pattern-attached substrate (1) and the position of the photomask pattern. Thereafter, by using an alignment mark that was simultaneously formed at the time of forming the black matrix, the substrate was aligned with a photomask for RED and then exposed to light. As a light source, a high-pressure mercury lamp was used. The exposure area was set to 200 mm×200 mm, and this area was irradiated for 20 seconds with I rays (wavelength; 365 nm) at an illuminance of 15 mW/cm2 and an exposure dose of 100 mJ/cm2. A developing device was installed at the downstream side of the exposure machine to perform developing. The black matrix layer/composition for forming a colored pattern-attached substrate (1) having undergone exposure treatment was transported at a constant speed of 400 mm/min, thereby obtaining a substrate (1) on which a RED colored layer had been laminated in a predetermined position of an opening portion of the black matrix on a glass substrate. Subsequently, the substrate was post-baked for 30 minutes at 220° C. in a baking furnace to thermally cure the RED colored layer. The same method as forming color layer of RED was repeated to form colored layers of GREEN and BLUE, thereby obtaining a color filter in which the black matrix and colored layers of RGB had been formed on the substrate (1). The BLUE colored layer was subjected to post-baking treatment, and then the black matrix was measured under the same conditions as described above (temperature; 23° C.±0.1° C., relative humidity; 60%±1%). As a result, the size of the pattern formed on the glass substrate was measured to be 99.999 mm in the transport direction and 100.002 mm in the vertical direction. During the production process from the end of the developing of the first layer (black matrix layer) to the end of the post-baking of the fourth layer (BLUE layer), the degree of change in dimension of the black matrix was 10 ppm. As a result, a color filter having a size of four inches and a resolution of 200 ppi (a BM line width of 7 µm and a pitch of 42 µm) could be formed on the glass substrate without causing pixel misalignment (formation of TIO electrode layer).

Subsequently, this color filter was put into a sputtering apparatus, and by using a reactive DC sputter that uses oxygen as reactant gas and using Indium Tin Oxide (ITO) as a target, an ITO film having a thickness of 150 nm was formed on the black matrix and the colored layers of RGB to obtain an ITO electrode layer. A value of sheet resistance of the ITO electrode prepared in this manner was 45 Ω/square.

(Formation of Columnar Spacer)
(Preparation of Dry Film)

In order to prepare a dry film for forming a columnar spacer, a composition for forming a columnar spacer that was formed of a negative photosensitive resin was coated onto a PET base film having a thickness of 25 µm by using a die coater to yield a thickness of 20 µm in a wet state. After being dried, the resultant was pre-baked for 2 minutes under a condition of a temperature of 90° C. to yield a thickness of 4.5 µm. Subsequently, a PET cover film having a thickness of 25 µm was laminated on the resultant, thereby obtaining a dry film for forming a columnar spacer (preparation of a laminate substrate).

The dry film for forming a pattern spacer from which the cover film had been peeled in advance was laminated on the substrate (1) on which the black matrix, the RGB colored layer, and the ITO electrode layer obtained as above had been formed, such that the composition for forming a columnar spacer faced the ITO electrode layer. The composition layer for forming a columnar spacer was continuously transferred under conditions of a roller pressure of 5 kg/cm2, a roller surface temperature of 120° C., and a speed of 800 mm/min. At this time, the process moves on to the next exposure process in a state where the base film was being attached onto the composition for forming a columnar spacer without being peeled off.

(Process of Exposure Treatment)

The laminate substrate obtained as above was put into the exposure apparatus equipped with a transport device extending from the upstream side to the downstream side thereof, and transported to an exposure portion.

The temperature of the body of the exposure apparatus was adjusted to 23° C.±0.1° C. and the relative humidity thereof was adjusted to 60%±1% respectively.

The laminate substrate was adsorbed and fixed onto an exposure stand, and then a gap between the base film of the laminate substrate and a photomask pattern was automatically adjusted to 30 µm. The photomask pattern used at this time was designed such that it became a spacer pattern formed on the black matrix.

Moreover, regarding the exposure position of the pattern of the laminate substrate, a distance from the end surface of the laminate substrate was automatically detected, and according to the detection result, the position was automatically adjusted such that a certain distance was kept between the laminate substrate and the position of the photomask pattern. Thereafter, by using an alignment mark simultaneously formed at the time of forming the black matrix, the substrate was aligned with the photomask for forming a columnar spacer and then exposed to light. As a light source, a high-pressure mercury lamp was used. The exposure area was set to 200 mm×200 mm, and this area was irradiated for 20 seconds with I rays (wavelength; 365 nm) at an illuminance of 15 mW/cm2 and an exposure dose of 300 mJ/cm2 (process of developing treatment and post-baking treatment).

A developing device was installed at the downstream side of the exposure machine to perform developing treatment. In this developing device, developing was performed while the base film was being peeled from the laminate substrate which had been exposed to light and was being transported at a constant speed of 400 mm/min. In this manner, a color filter was obtained in which a pattern spacer was formed in a predetermined position of a lattice pattern portion of the black matrix of the substrate (1) having the black matrix, the RGB colored layer, and the ITO electrode layer described above formed thereon. The columnar spacer was then thermally cured by being subjected to post-baking treatment for 30 minutes at 220° C. in a baking furnace. As a result, a front plane which used the above spacer pattern and included the black matrix, the RGB colored layer, the ITO electrode layer, and the columnar spacer formed on the substrate (1) was obtained.

(Preparation of Back Plane)
(Formation of TFT Electrode Layer)

A glass plate (OA-10 manufactured by Nippon Electric Glass Co., Ltd.) for forming liquid crystal display devices was used as a transparent substrate to form a TFT electrode layer on a transparent substrate according to the method disclosed in Japanese Unexamined Patent Application, First Publication No. 2004-140381.

That is, an amorphous Si layer having a thickness of 100 nm was formed on the glass substrate, and then a silicon oxide layer (SiOx) was formed by a vacuum film formation method. Thereafter, a TFT layer and a pixel electrode were formed on the silicon oxide layer by using photolithography and etching, thereby obtaining a TFT array-attached glass substrate to be a back plane.

(Production of Liquid Crystal Display Device)
(Formation of Alignment Layer)

A liquid crystal alignment layer was formed on the front and back planes prepared as above. Both the substrates were washed with pure water and then coated with a liquid crystal aligning agent containing polyimide by using a printing press (flexographic press) for coating a liquid crystal aligning layer. The substrates were then dried for 20 minutes in an oven at 180° C. to form a coating film having an average dry film thickness of 600 Å on the ITO-formed surface of the front plane and on the TFT electrode layer-formed surface of the back plane. The coating film was subjected to rubbing treatment in a rubbing apparatus equipped with a roller wrapped with rayon cloth, at a rotation frequency of the roller of 400 rpm, a stage movement speed of 30 mm/sec, and a length of fiber pushed in of 0.4 mm. The substrates were washed with water and then dried for 10 minutes in an oven at 120° C. A portion of the front plane that was supposed to be coated with a sealant was coated with a sealant, in the form of a closed loop by using a dispenser.

As the sealant, a resin composition which contains a bisphenol A type methacrylic acid-modified epoxy resin and is curable by both the light and heat was used. Moreover, a spherical spacer having the almost same size as that of the columnar spacer formed as above was mixed with the sealant, in an amount of 0.5% by mass based on the resin composition. The amount of the sealant coated was adjusted such that the seal width (0.7 mm) of the liquid crystal display device was obtained. Thereafter, to a predetermined position in the closed loop of the sealant, the liquid crystal composition (LC-13) described in Example 11 was dropped 90 times for a sheet of front plane, by 24.7 pL per each time (2,230 pL in total) by using a constant-volume metering pump-type dispenser.

The front plane having undergone dropping of liquid crystals and the back plane were adsorbed onto an electrostatic chuck. The front and back planes were disposed such that they faced each other, and the back plane was slowly taken down and stopped at a point in time when a distance between the back plane and the front plane became 300 μm. In this state, the internal pressure of the vacuum chamber was reduced to 100 Pa. By using the alignment mark that had been formed in advance, the sticking position of the front plane and the back plane was adjusted. After the alignment was completed, the front plane and the back plane were caused to get closer to each other, and both the substrates were held at a height at which the sealant came into contact with the TFT electrode layer. In this state, inert gas was injected into the vacuum chamber, and the internal pressure of the system was returned to atmospheric pressure. Due to the atmospheric pressure, the front plane was pressed against the back plane, whereby a cell gap that was as long as the height of the columnar spacer was formed. Subsequently, the portion coated with the sealant was irradiated with UV rays (365 nm, 30 kJ/m2) to cure the sealant, whereby the substrates were fixed to each other. In this state, the substrates including the liquid crystal composition were transported to a heating apparatus and held at a surface temperature of 120° C. for 1 hour. After the heating ended, the resultant was air-cooled, thereby obtaining a liquid crystal display device for driving active matrix.

REFERENCE SIGNS LIST

100: substrate a
102: TFT layer
103: pixel electrode
104: passivation layer
105: alignment layer a
200: substrate b
201: planarizing layer (overcoat layer)
202: black matrix
203: color filter
204: transparent electrode
205: alignment layer b
301: sealant
302: columnar spacer
303: liquid crystal layer
304: projection
401: columnar spacer pattern photomask
402: composition for forming columnar spacer

The invention claimed is:

1. A liquid crystal composition having positive dielectric anisotropy, consisting of:

a dielectrically positive compound represented by Formula (1.1);

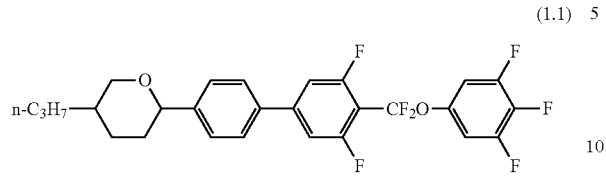
(1.1)

and;
14% by mass or more of a compound represented by Formula (1.2):

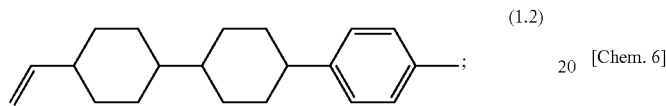
(1.2)

a compound represented by Formula (3.3):

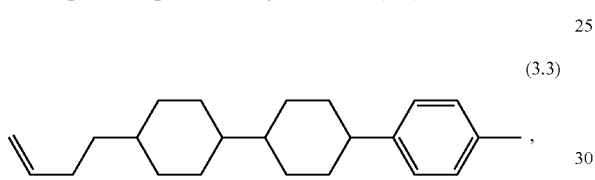
(3.3)

at least one compound selected from the group consisting of compounds represented by Formulae (4.1), (4.2) and (4.3):

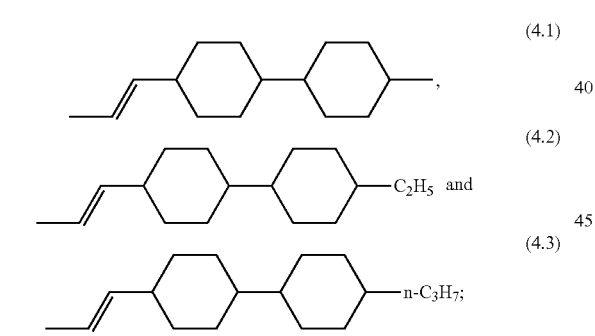
(4.1)

(4.2)

(4.3)

and
at least one compound selected from the group consisting of the compounds represented by General formulae (I), (III), (VII), (X), (IV), (II),

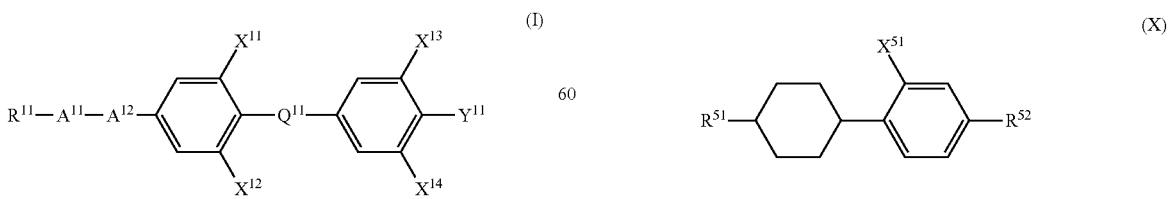
(I)

wherein $R^{11}$ represents an alkyl group having 2 to 5 carbon atoms, each of $X^{11}$ to $X^{14}$ independently represents a fluorine atom or a hydrogen atom, $Y^{11}$ represents a fluorine atom, $A^{11}$ represents a 1,4-phenylene group, a 1,4-cyclohexylene group,

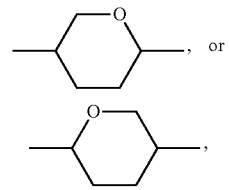
, or $A^{12}$ represents a 1,4-phenylene group or a 1,4-cyclohexylene group, and $Q^{11}$ represents a single bond or —$CF_2O$—,

[Chem. 6]

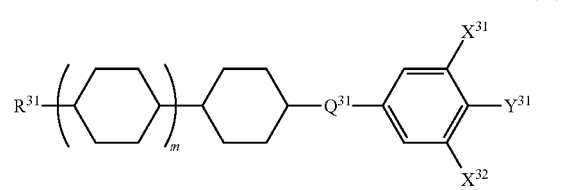
(III)

wherein $R^{31}$ represents an alkyl group having 2 to 5 carbon atoms, each of $X^{31}$ and $X^{32}$ independently represents a fluorine atom or a hydrogen atom, $Y^{31}$ represents a fluorine atom, $Q^{31}$ represents a single bond or —$CF_2O$—, and m is 0 or 1, (VII)

wherein each of $R^{71}$ and $R^{72}$ independently represents an alkyl or alkenyl group having 2 to 5 carbon atoms, each of $X^{71}$ or $X^{72}$ independently represents a fluorine atom or a hydrogen atom, $A^{71}$ represents a 1,4-cyclohexylene group, and each of m and n independently represents 0 or 1,

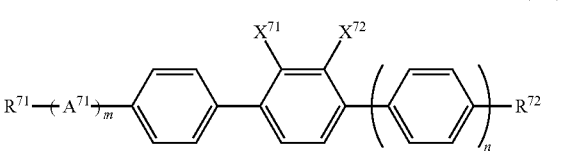
(X)

wherein each of $R^{51}$ and $R^{52}$ independently represents an alkyl or alkoxy group having 2 to 5 carbon atoms, and $X^{51}$ represents a fluorine atom or a hydrogen atom, (IV)

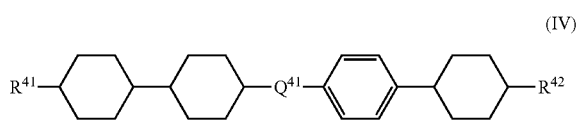

wherein each of R⁴¹ and R⁴² indeendently represents an alkyl group having 2 to 5 carbon atoms, Q⁴¹ represents a single bond, —CH₂CH₂—, or —COO—, (II)

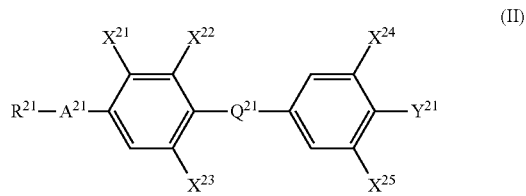

wherein R²¹ represents an alkyl group having 2 to 5 carbon atoms, each of X²¹ to X²⁵ independently represents a fluorine atom or a hydrogen atom, Q²¹ represents a single bond or —CF₂O—, Y²¹ represents a fluorine atom, and A²¹ represents a 1,4-phenylene group or a 1,4-cyclohexylene group.

2. The liquid crystal composition according to claim 1, wherein the compound represented by General formula (I) is included in the liquid crystal composition.

3. The liquid crystal composition according to claim 1, wherein the compound represented by General formula (III) is included in the liquid crystal composition.

4. The liquid crystal composition according to claim 1, wherein the compound represented by General formula (VII) is included in the liquid crystal composition.

5. The liquid crystal composition according to claim 1, wherein the compound represented by General formula (X) is included in the liquid crystal composition.

6. The liquid crystal composition according to claim 1, wherein the compound represented by General formula (IV) is included in the liquid crystal composition.

7. The liquid crystal composition according to claim 2, wherein the compound represented by General formula (I) is at least one compound selected from a group of compounds represented by Formulae (19.6), (19.7), (6.1), (6.2), (12.3), and (12.4):

(19.7)

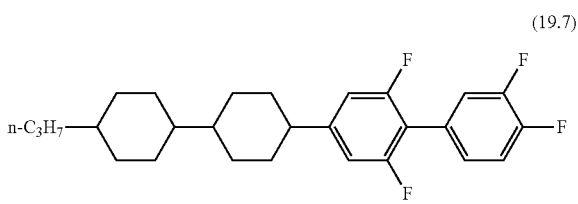

(6.1)

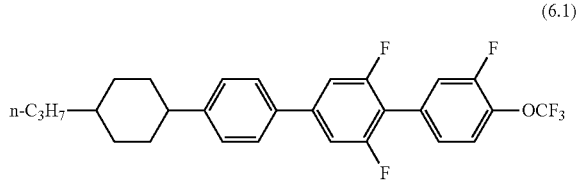

(6.2)

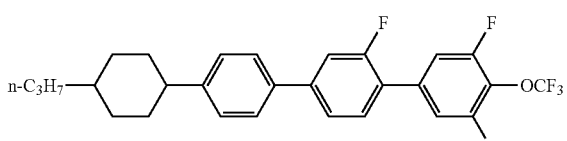

(19.6)

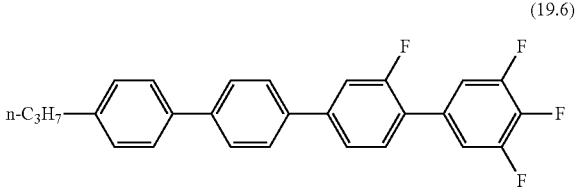

(12.3)

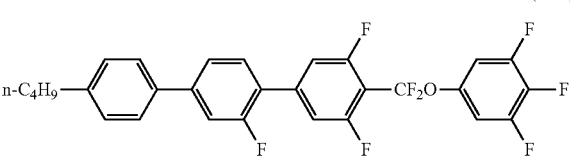

(12.4)

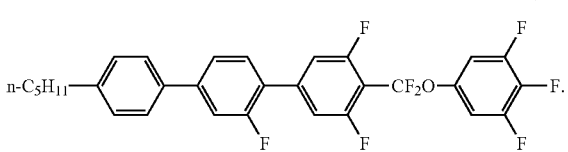

8. The liquid crystal composition according to claim 3, wherein the compound represented by General formula (III) is at least one compound selected from a group of compounds represented by Formulae (11.2), (11.3), (20.2), (20.7), and (20.8):

(11.2)

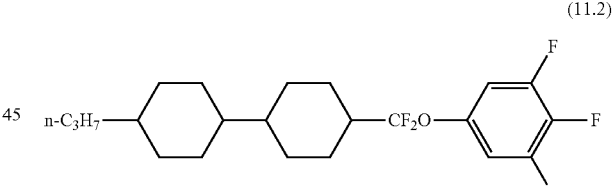

(11.3)

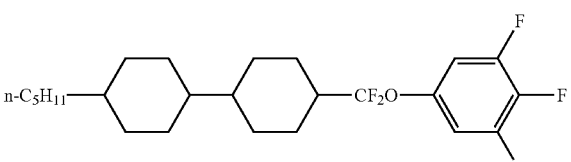

(20.2)

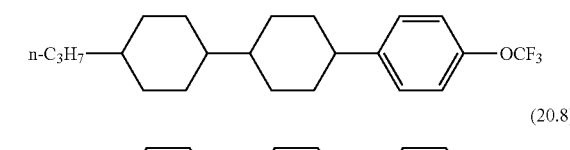

(20.8)

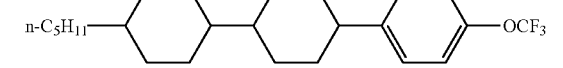

-continued

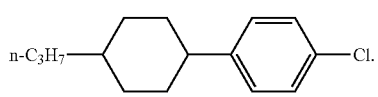
(20.7)

9. The liquid crystal composition according to claim 4, wherein the compound represented by General formula (VII) is at least one compound selected from a group of compounds represented by Formulae (15.2), (10.7), (10.8), and (13.5) to (13.8):

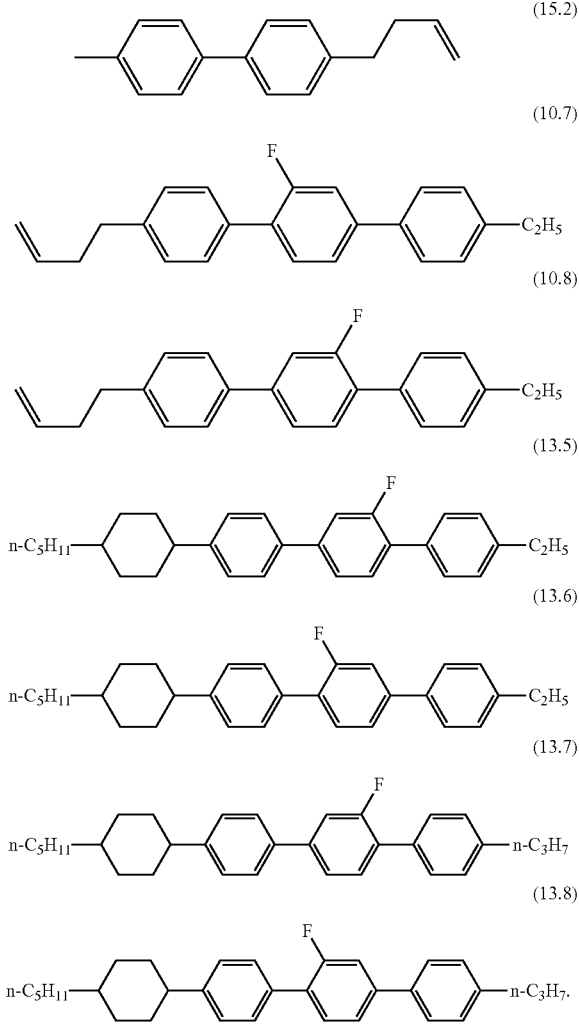

10. The liquid crystal composition according to claim 5 wherein the compound represented by General formula (X) is a compound represented by Formula (16.1):

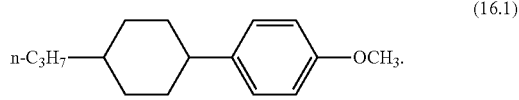
(16.1)

11. The liquid crystal composition according to claim 6, wherein the compound represented by General formula (IV) is a compound represented by Formula (17.1):

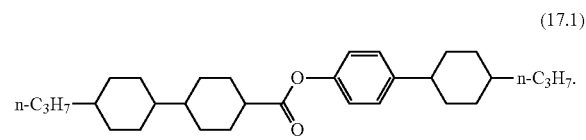
(17.1)

12. The liquid crystal composition according to claim 1, wherein the compound represented by General formula (II) is included in the liquid crystal composition.

13. A liquid crystal display device for driving an active matrix that uses the liquid crystal composition according to claim 1.

14. The liquid crystal composition according to claim 1, wherein as said at least one compound selected from the group consisting of compounds represented by Formulae (4.1), (4.2) and (4.3), the liquid crystal composition comprises the compound represented by Formula (4.3).

15. The liquid crystal composition according to claim 1, wherein a content of said at least one compound selected from the group consisting of compounds represented by Formulae (4.1), (4.2) and (4.3) is 20% by mass or less.

16. The liquid crystal composition according to claim 1, wherein a content of said at least one compound selected from the group consisting of compounds represented by Formulae (4.1), (4.2) and (4.3) is 4% to 14% by mass.

17. The liquid crystal composition according to claim 14, wherein a content the compound represented by Formula (4.3) is 4% to 14% by mass.

18. The liquid crystal composition according to claim 1, wherein the compound represented by Formula (1.2) is contained at 16% by mass or more.

* * * * *